United States Patent
Jaeger

(10) Patent No.: US 7,181,695 B2
(45) Date of Patent: Feb. 20, 2007

(54) SYSTEM AND METHOD FOR SENDING AND RECEIVING ELECTRONIC MESSAGES USING GRAPHIC DIRECTIONAL INDICATORS

(75) Inventor: Denny Jaeger, Oakland, CA (US)

(73) Assignee: NBOR Corporation, Oakland, CA (US)

( * ) Notice: Subject to any disclaimer, the term of this patent is extended or adjusted under 35 U.S.C. 154(b) by 376 days.

(21) Appl. No.: 10/757,239

(22) Filed: Jan. 13, 2004

(65) Prior Publication Data

US 2005/0154991 A1    Jul. 14, 2005

(51) Int. Cl.
*G06F 17/00* (2006.01)
(52) U.S. Cl. .................. 715/752; 715/754; 715/863
(58) Field of Classification Search ........ 715/745–759, 715/763–764, 769, 863
See application file for complete search history.

(56) References Cited

U.S. PATENT DOCUMENTS

| 5,335,339 | A |   | 8/1994 | Maejima et al. |
| 5,497,422 | A | * | 3/1996 | Tysen et al. ................ 713/157 |
| 5,933,637 | A | * | 8/1999 | Hurley et al. ............... 717/107 |
| 2003/0020749 | A1 | * | 1/2003 | Abu-Hakima et al. ...... 345/752 |
| 2004/0034801 | A1 | * | 2/2004 | Jaeger ......................... 713/202 |
| 2004/0039731 | A1 | * | 2/2004 | Levy ............................. 707/3 |
| 2004/0153456 | A1 | * | 8/2004 | Charnock et al. ............. 707/10 |

* cited by examiner

*Primary Examiner*—Tadesse Hailu

(57) ABSTRACT

A system and method for sending and receiving electronic messages, e.g., emails, allows a user to simply draw a graphic directional indicator, e.g., an arrow, in a computer operating environment to send emails. Depending on the drawn graphic directional indicator, the entire computer operating environment or selected graphic objects in the computer operating environment can be transmitted as an electronic message.

57 Claims, 21 Drawing Sheets

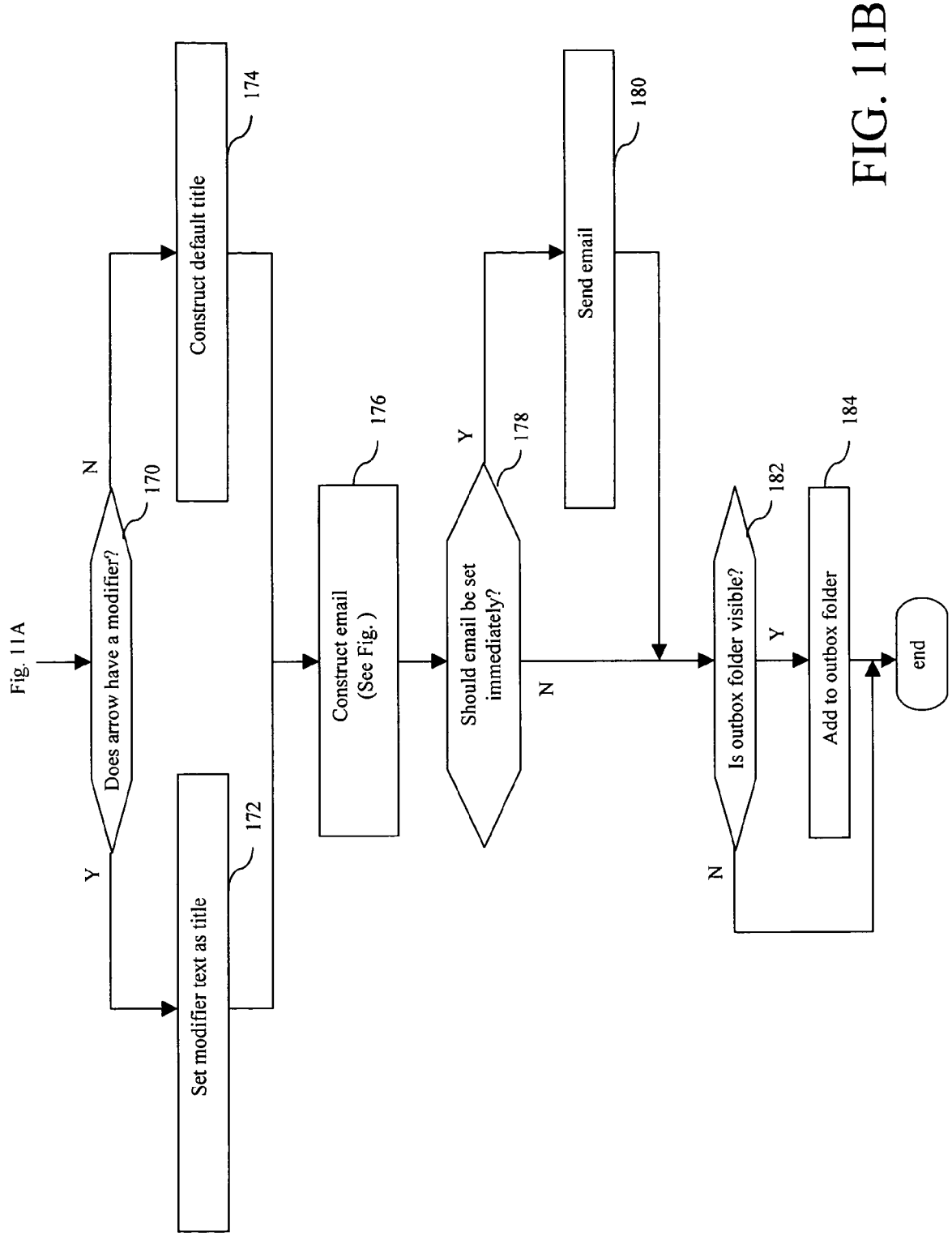

SYSTEM AND METHOD FOR SENDING AND RECEIVING ELECTRONIC MESSAGES USING GRAPHIC DIRECTIONAL INDICATORS

FIELD OF THE INVENTION

The invention relates generally to computer programs, and more particularly to a system and method for sending and receiving electronic messages via a computer network.

BACKGROUND OF THE INVENTION

Electronic mail ("email") has become one of the most popular forms of communication between parties over long and short distances. Using one or more computer networks, such as local area networks (LANs), wide area networks (WANs) and/or the Internet, emails can be used to not only transmit textual messages but also computer files. These computer files can include any computer file, such as a word processing file, an image file, an audio file or a video file. While a textual message is transmitted as an integrated part of an email, a computer file is usually transmitted as an attachment to the email so that a recipient receives the computer file along with the textual message of the email.

Typically, a separate email application running in a computer system is commonly used to send and receive emails. A conventional email application allows a user to enter a textual message into the body of an email, as well as to attach one or more computer files to the email. The attaching of a computer file to an email using a conventional email application involves first locating that computer file to be attached in a storage medium, e.g., the hard drive of the computer system, and then entering a command to attach the computer file to the email.

Some computer applications, such as word processing applications, include an email feature that allows contents displayed in an application environment to be transmitted as an email. However, the email feature of these computer applications typically involves using the default email application installed in the computer system to send the displayed contents as emails. Using the email application, the displayed contents in a particular application may be sent as an attachment or as the message body of an email. Again, one or more computer files can also be transmitted along with the email as attachments.

A concern with conventional email applications and computer applications with an email feature is that a user is significantly limited to what can and cannot be sent as an email. As an example, a user cannot select a text object from a word processing application and a drawn object from a drawing application to send both objects in an email without moving one or both object to a single application environment. In fact, a single graphic object among multiple graphic objects in a single application environment cannot generally be selected and sent as an email. As another example, a user cannot send the entire application environment, including tool bar or menu elements that may be customized with respect to position and/or type, as an email.

Another concern with conventional email applications and computer applications with an email feature is that performing advanced email operations can be complex and challenging. As an example, creating a group of recipients to send multiple copies of email may involve navigating through a number of pull-down menus, selecting an appropriate entry and then selecting the desired recipients to be added to the group. Such procedure can be daunting for a novice user who is not familiar with an email application or an email feature of a particular computer application.

In view of these concerns, what is needed is a system and method for sending and receiving emails that provides more flexibility with respect to selection of items to be sent as emails and is user friendly with respect to performing email operations.

SUMMARY OF THE INVENTION

A system and method for sending and receiving electronic messages, e.g., emails, allows a user to simply draw a graphic directional indicator, e.g., an arrow, in a computer operating environment to send emails. Depending on the drawn graphic directional indicator, the entire computer operating environment or selected graphic objects in the computer operating environment can be transmitted as an electronic message.

A system for sending and receiving electronic messages in accordance with an embodiment includes a display device that can display a graphic representation of a destination of an electronic message, a graphic directional indicator and a graphic element, a module configured to send the graphic element as part of the electronic message when the graphic directional indicator is drawn on the display device to the graphic representation and a function associated with said graphic directional indicator is activated, and a network interface connected to a computer network. The network interface is configured to transmit the electronic message to the destination through the computer network.

A method for sending and receiving electronic messages in accordance with an embodiment includes displaying a graphic representation of a destination on a display device to deliver an electronic message, drawing a graphic directional indicator to the graphic representation on the display device, and performing a function associated with the graphic directional indicator in response to a user input to send at least one graphic element displayed on the display device to the destination as part of the electronic message.

An embodiment of the invention includes a storage medium, readable by a computer, tangibly embodying a program of instructions executable by the computer to perform the method steps for sending and receiving electronic messages.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIGS. 11A and 11B show a flow chart for sending an email in accordance with an embodiment of the invention.

DETAILED DESCRIPTION

A system and method for sending and receiving electronic messages or emails in accordance with an embodiment of the invention allows a user to simply draw a graphic directional indicator, e.g., an arrow, in a computer operating environment to send emails. Depending on the drawn graphic directional indicator, the entire computer operating environment or selected graphic elements or objects in the computer operating environment can be transmitted as an electronic message. In addition, the system and method allows a user to simply draw a second graphic directional indicator, e.g., a second arrow, that intersects or touches the first graphic directional indicator to enter a title for the electronic message or to enter a command to customize the sending operation of the electronic message. Furthermore, the system and method allows users to secure an entire electronic message and/or any graphic object of the electronic message using one or more password objects, as described in more detail below.

The system and method is described below with respect to a computer operating environment referred to herein as a "Blackspace" environment. The word "Blackspace" is a trademark of the NBOR Corporation. The Blackspace environment presents one universal drawing surface that is shared by all graphic objects within the environment. The Blackspace environment is analogous to a giant drawing "canvas" on which all graphic objects generated in the environment exist and can be applied. Each of these graphic objects can have a user-created relationship to any or all the other objects. There are no barriers between any of the objects that are created for or exist on this canvas. However, the invention is not limited to the Blackspace environment and can be implemented in any computer operating environment.

As used herein, the term "objects" include recognized graphic objects (e.g., stars, squares, circles, arrows, etc.), free drawn objects (sketches, drawings, lines, etc.), pictures in various file format (.png, .jpg, .bmp, .gif, etc.), graphic control devices (switches, faders, knobs, joysticks, etc.), videos in various file format (.mpg, .avi, .mov, etc.), text, and other graphic objects that are displayed on a display device.

Figure 1:
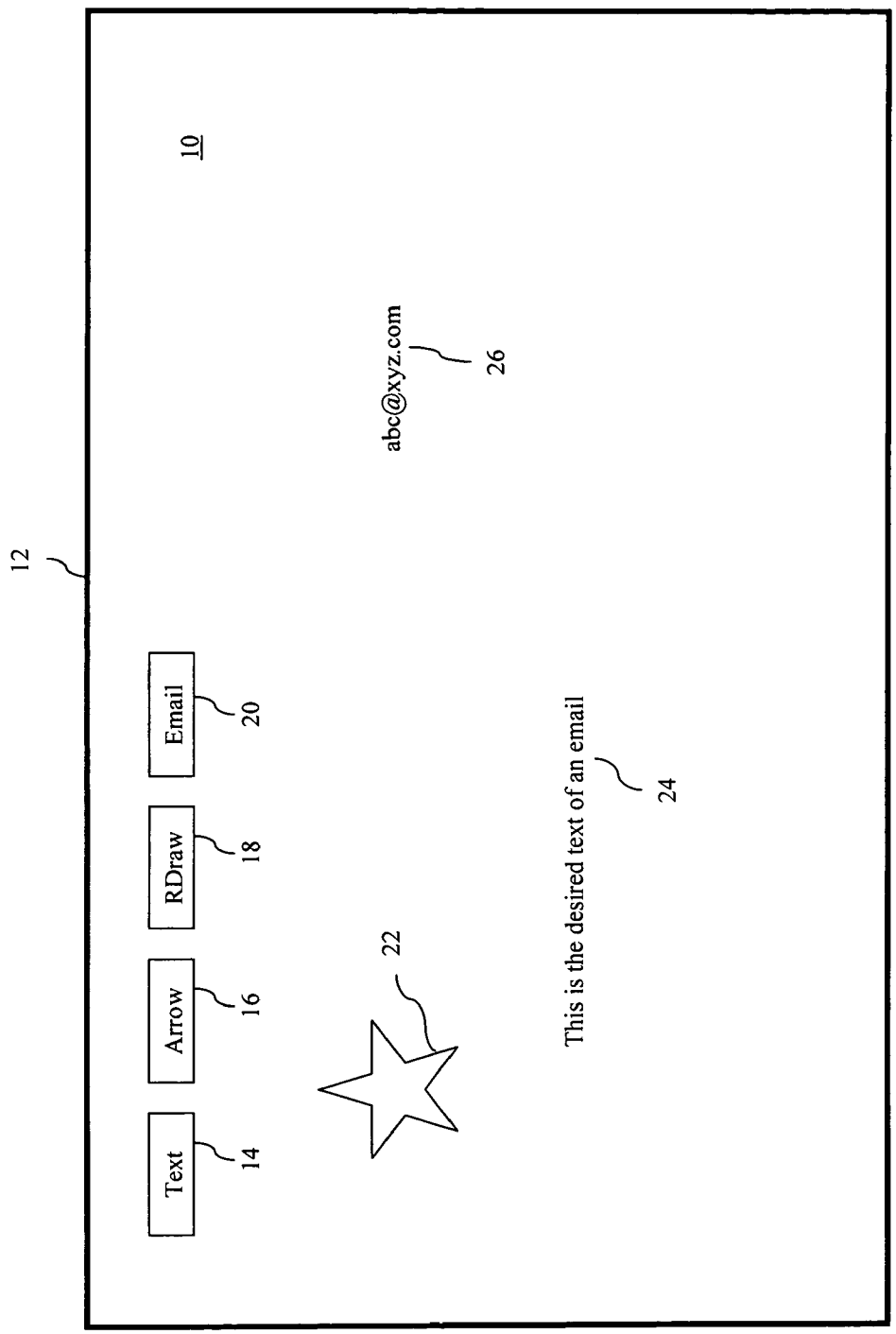
FIG. 1 shows a computer operating environment for sending and receiving emails in which graphic objects and an email address are displayed in accordance with an embodiment of the invention.

An exemplary process for sending an email using the system and method in accordance with an embodiment of the invention is described with reference to FIG. 1. In FIG. 1, a Blackspace environment 10 displayed in a display device 12 of a computer system is shown. The Blackspace environment 10 is shown to include a text switch 14, an arrow switch 16, a recognize draw switch 18 and an email switch 20. These switches 14–20 are control devices that can be turned on to activate certain features of the Blackspace environment 10. The text switch 14 activates the text feature, which enables a user to enter text into the Blackspace environment 10. The arrow switch 16 activates the arrow recognition feature, which enables the computer program that provides the Blackspace environment 10 to recognize an arrow drawn by a user. Similar to the arrow switch 16, the recognize draw switch 18 activates the drawing recognition feature, which enables the Blackspace program to recognize hand drawn objects as predefined graphic objects, such as line, circles, stars and rectangles. The email switch 20 activates the mailbox feature, which enables a user to manage incoming and outgoing emails. The mailbox feature is described in more detail below. Although not shown, the Blackspace environment 10 may include additional switches that activate other features of the environment. In the Blackspace environment 10, the user has full control of the number and type of switches displayed, as well as the positions of the displayed switches.

As shown in FIG. 1, the Blackspace environment 10 further includes a recognized graphic object in the form of a star 22 and text objects 24 and 26. In this example, the text object 24 is the desired text of an email and the text object 26 is the network address, e.g., the email address, of a recipient for the email. These text objects 24 and 26 can be created by activating the text switch 14 and then typing the desired text in the Blackspace environment 10. The star 22 can be created by activating the recognize draw switch 18 and then free drawing a star, which when completed will automatically be recognized by the Blackspace program as a star and be redrawn as a computer generated star that replaces the hand drawn star.

Figure 2A:
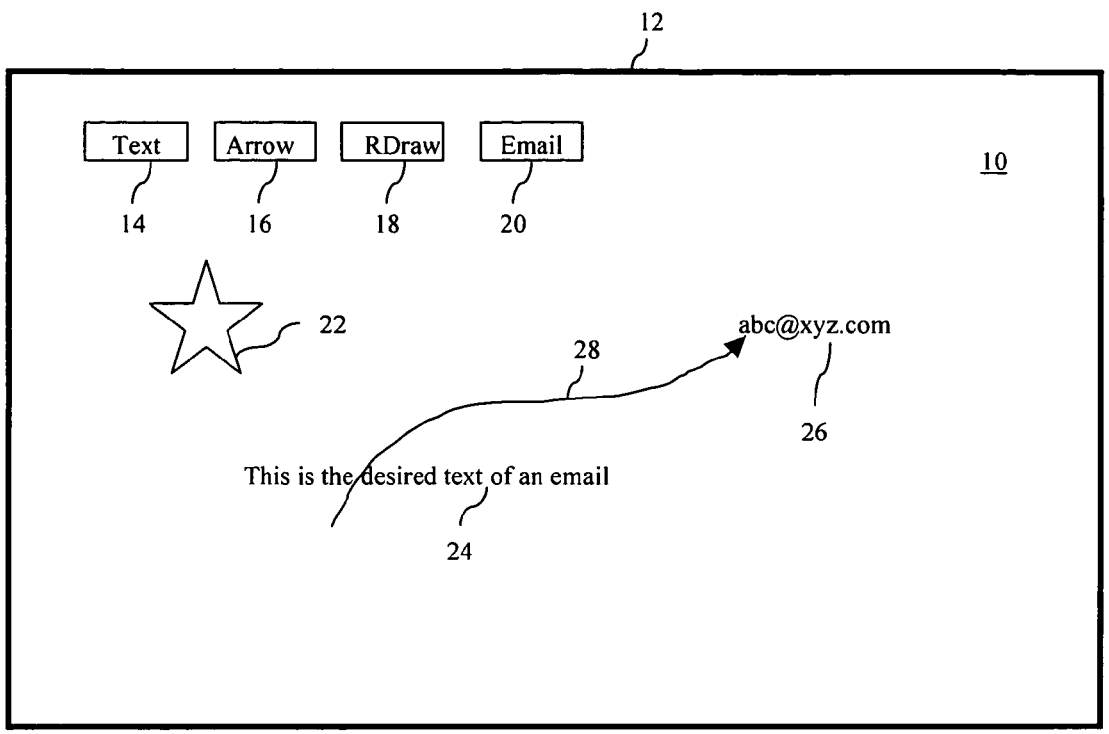
FIGS. 2A and 2B illustrate drawing of an arrow to send a single selected graphic element to the email address in an email in accordance with an embodiment of the invention.

If a user wants to send the email text 24 to an email address, e.g., the email address 26, the user can simply draw an arrow 28 of a specific color (e.g., a gray arrow) from the email text to the email address, as shown in FIG. 2A, to initiate an arrow logic of "send to". This arrow logic is recalled by selecting a color that corresponds to that arrow logic. For more information regarding arrow logics, see pending U.S. patent application Ser. No. 09/880,397 entitled "Arrow Logic System for Creating and Operating Control Systems", filed on Jun. 12, 2001, which is incorporated herein by reference.

A graphic object to which an arrow is pointed is treated as a "target" of the arrow, and a graphic object that is intersected by the shaft of the arrow is treated a "source" of the arrow. In FIG. 2A, the arrow 28 is drawn such that the email text 24 is intersected by the shaft of the arrow and the arrowhead points to the email address 26. Thus, the email address 26 is the target of the arrow 28 and the email text 24 is the source of the arrow. Furthermore, as described in more detail below, a graphic object that is at least substantially encircled by an arrow, or graphically glued or agglomerated to another graphic object that is intersected by or at least substantially encircled by the arrow is also treated as a "source" of that arrow.

The arrow 28 can be drawn by selecting a color from a graphic inkwell (not shown), turning on the arrow switch 16, and then drawing the arrow by, for example, left-clicking on a computer mouse when the cursor is at a first desired location and dragging the cursor to a second desired location. The first desired location coincides with the shaft end of the arrow 28, while the second desired location coincides with the arrowhead of the arrow.

When the arrow 28 is recognized as an arrow with an arrow logic, a graphic indication of this state is displayed. As an example, the arrowhead of the arrow 28 may turn white. At this point, the user may activate the arrow 28 to execute the function associated with the arrow logic of the arrow. In this example, due to the context of the arrow, i.e., the arrow is drawn to an email address, the function associated with the arrow logic of the arrow is to construct an email to send the email text 24 to the email address 26. The activation of the arrow 28 completes the process for sending an email of text to a single email address.

As described in more detail below, the text of each text object source sent as an email is copied into the body of the email in a universal text format, e.g., ASCII format, so that the text object can be viewed using any conventional email application or other suitable computer application. In addition, the text object is also attached to the email as an attachment in a format that is recognizable in the Blackspace environment. Thus, in the above example, the email text 24 is copied into the body of the email being sent and the email text is also attached to the email as an attachment.

Figure 2B:
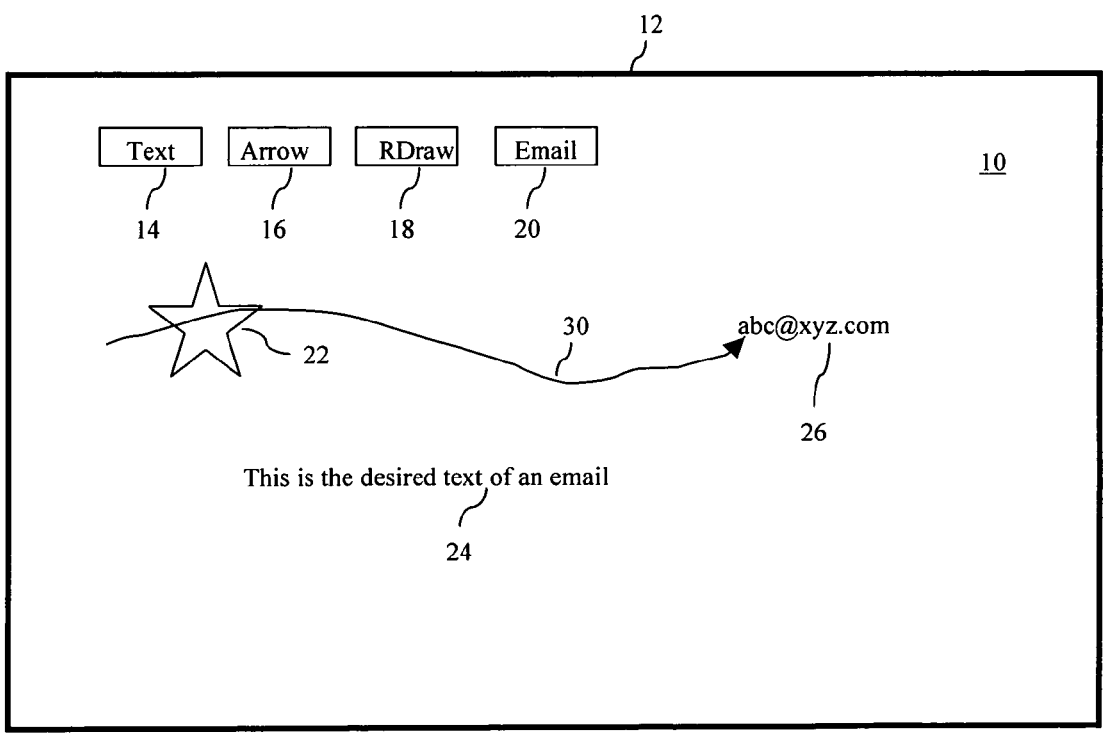

Similar to the process for sending the email text 24 to an email address, if the user wants to send the star 22 to an email address, e.g., the email address 26, the user simply draws an arrow 30 with the arrow logic of "send to" from the star to the email address, as shown in FIG. 2B, such that the star is the source of the arrow and the email address is the target of the arrow. In FIG. 2B, the arrow 30 was drawn to intersect the star 22 so that the star is recognized as a source of the arrow. When the arrow 30 is activated, the star is attached to an email and sent to the email address 26. Since the arrow 30 has no source that is a text object, the body of the email will be blank or will include a default body, which may include a hyperlink to a predefined website.

When any graphic object, such as the star 22, is sent as an attachment to an email, not only is the graphic object transmitted, but also any property or characteristic associated with that graphic object. As an example, in the Blackspace environment 10, one or more graphic objects can be "assigned" to another object, which effectively means that the assigned objects are contained in the "assigned to" object, which is referred to herein as an assignment object. The assignment object can be activated to make the assigned objects appear or disappear from the Blackspace environment 10, while preserving the layout of the assigned objects. Thus, complex arrangements of various graphic object, including text, can be stored in an assignment object. This property of an assignment object is also transmitted when the assignment object is transmitted in an email. Thus, when the assignment object is received, the received assignment object can be activated in another Blackspace environment to make the assigned objects of that assignment object appear onscreen.

Figure 3A:
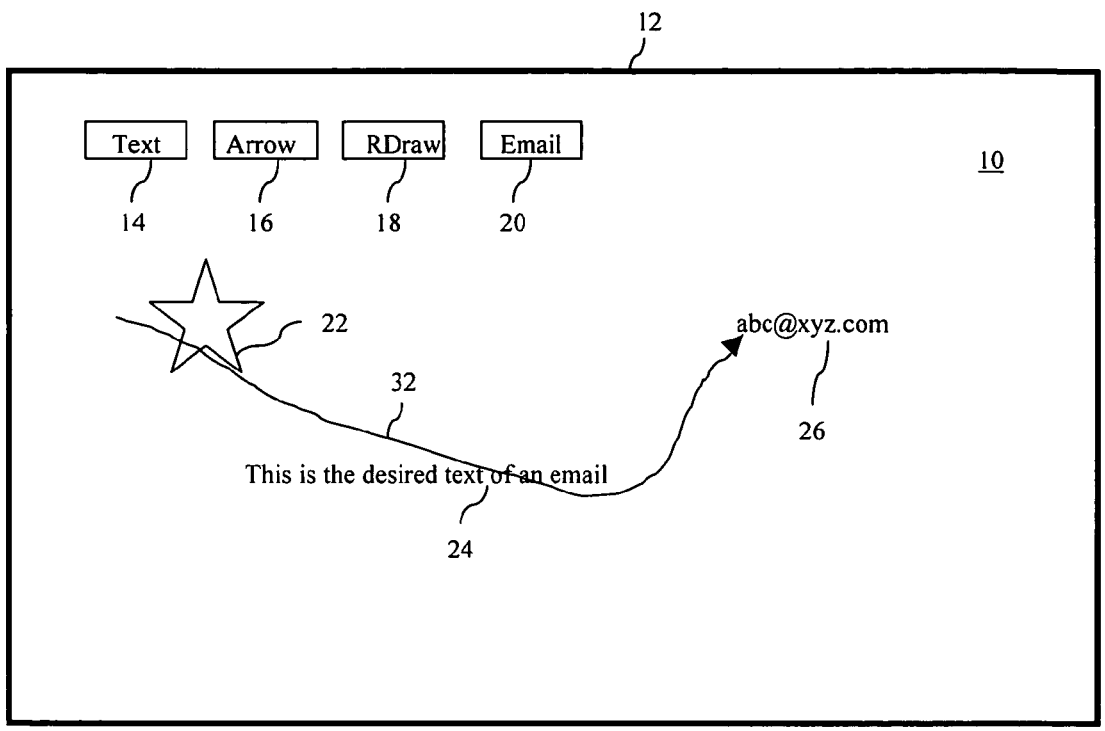
FIGS. 3A, 3B, 3C and 3D illustrate drawing of an arrow to send multiple selected graphic elements to the email address in an email in accordance with an embodiment of the invention.
Figure 3B:
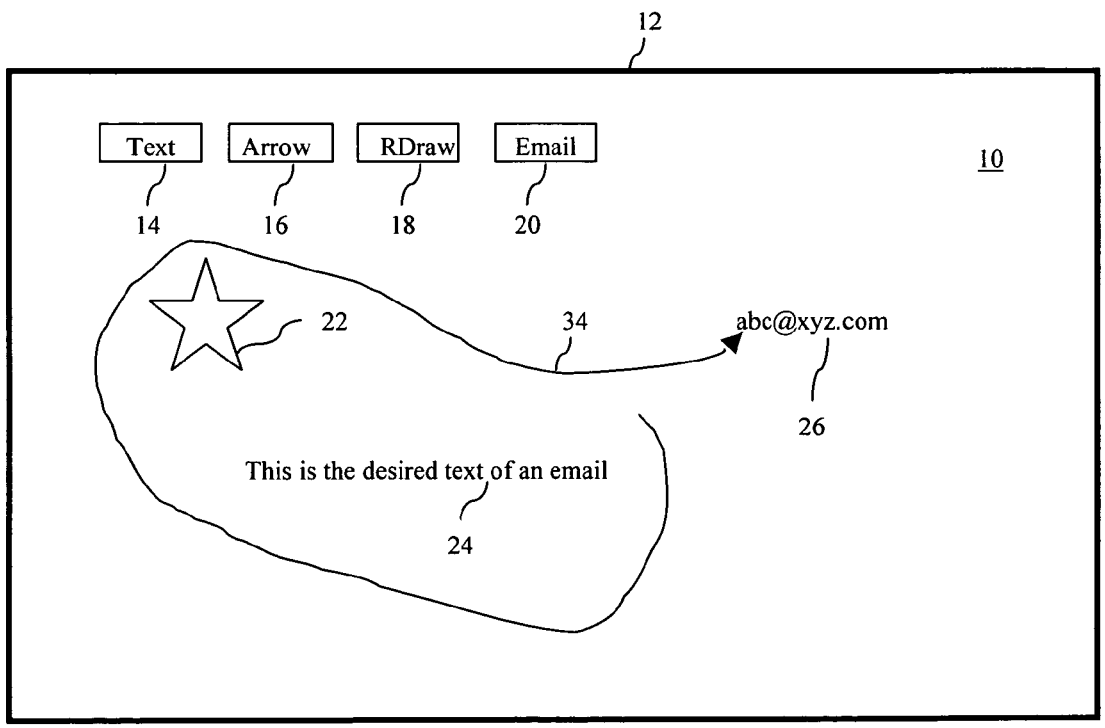
Figure 3C:
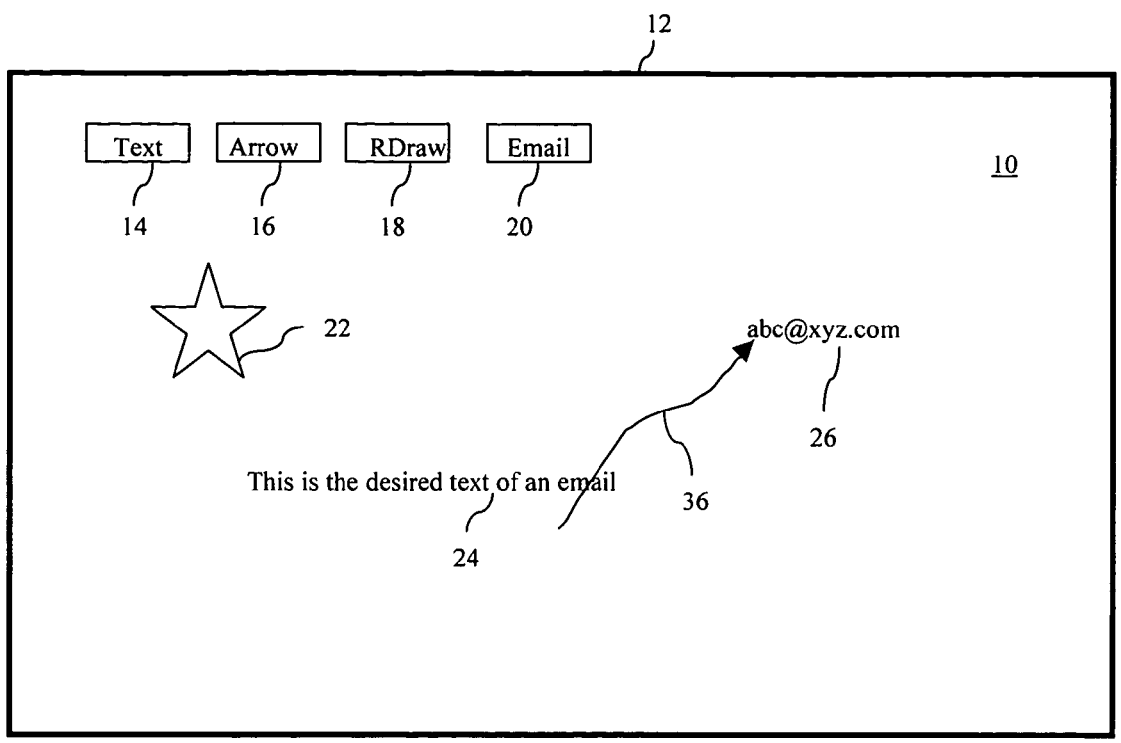
Figure 3D:
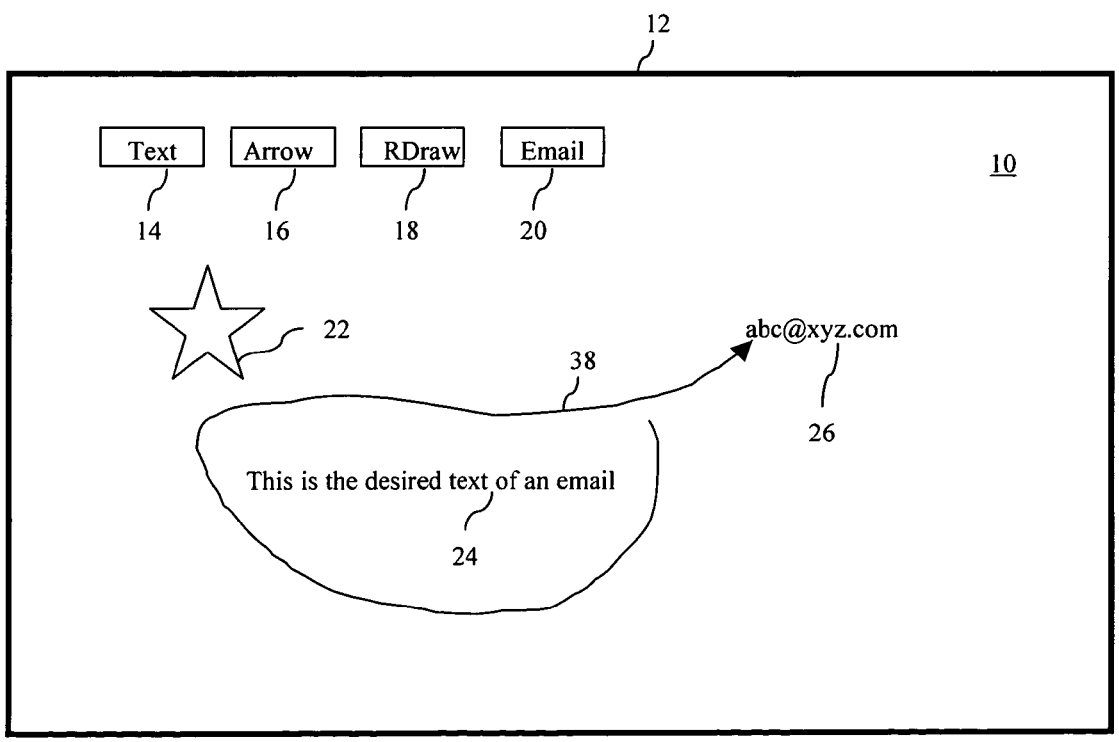

If the user wants to send multiple graphic objects, e.g., the star 22 and the email text 24, to an email address, e.g., the email address 26, one or more of the following approaches can be used:

1) draw an arrow 32 with the arrow logic of "send to" that intersects both the star 22 and the email text 24, as shown in FIG. 3A;

2) draw an arrow 34 with the arrow logic of "send to" that substantially encircles both the star 22 and the email text 24, as shown in FIG. 3B; or 3) graphically "glue" the star 22 and the email text 24 together to agglomerate the star and the email text and then draw an arrow 36 or 38 with the arrow logic of "send to" that at least intersects or substantially encircles one of the star and the email text, as shown in FIGS. 3C and 3D. In the Blackspace environment 10, the "gluing" of the star 22 and the email text 24 may be achieved by turning on a lasso switch (not shown) to activate the gluing feature and then selecting both the star and the email text by, for example, drawing a temporary lasso in the form of a rectangle that intersects and/or encloses the star and the email text.

Using one of the above approaches, multiple graphic objects displayed in the Blackspace environment 10 can be sent in a single email to a designated email address. When sending multiple graphic objects in an email, the graphic objects are transmitted as an attachment of the email. In addition, for each text object in the email, the content of that text object is copied into the body of the email in a universal text format, e.g., ASCII format. Furthermore, any functional relationships between the graphic objects are also transmitted. As an example, if two graphic faders having a control relationship between them such that one of the faders has a control over another, then this relationship is also transmitted when the faders are sent in an email. Consequently, when a recipient of the email loads the faders into a Blackspace environment, the functional relationship between the faders will be maintained such that the same controlling fader can control the other fader.

Figure 4:
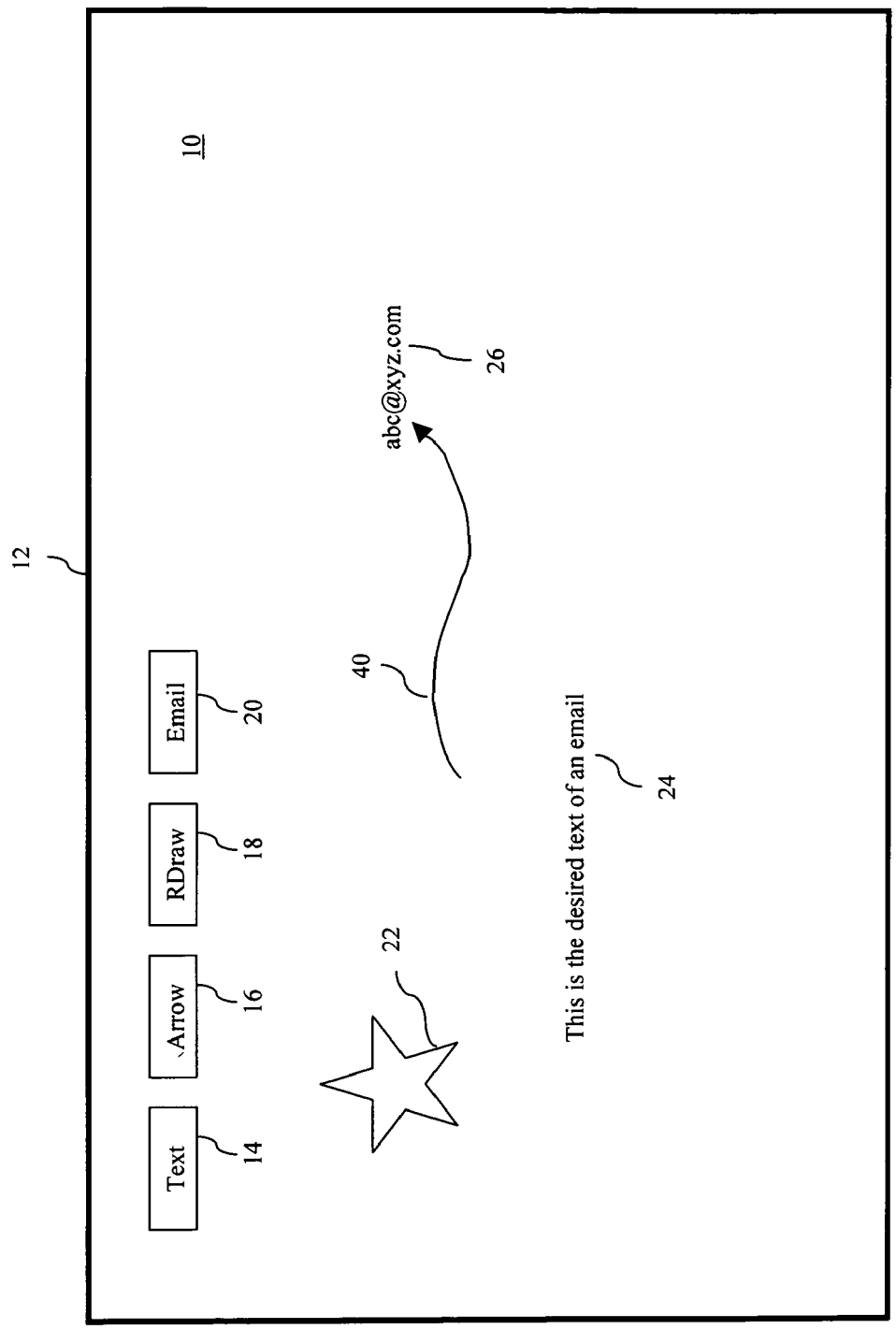
FIG. 4 illustrates drawing of an arrow to send a log of the current system state of the computer operating environment to the email address in an email in accordance with an embodiment of the invention.

If the user wants to send the entire Blackspace environment 10 in the current state to an email address, e.g., the email address 26, the user simply draws an arrow 40 with the arrow logic of "send to" from any blank surface of the Blackspace environment 10 to the email address, as shown in FIG. 4. When the arrow 40 is activated, a log of the current Blackspace environment 10 is created and transmitted as an email attachment to the email address. A log is a computer file that includes complete definitions of every control in a Blackspace environment. A log contains sufficient data to recreate all of these controls and the state of all the contexts in a Blackspace environment. Thus, a log of the Blackspace environment 10 can recreate the current system state of the Blackspace environment 10 when loaded onto another Blackspace environment. Consequently, when the email with the log is received, the state of the Blackspace environment 10 at the time when the email was sent can be recreated by loading the attached log in a Blackspace environment. Using this approach, the entire Blackspace environment 10, including the switches 14–20 and the email text 24 in the exact layout shown in FIG. 4, can be transmitted to the email address 26 by simply sending an email.

Figure 5A:
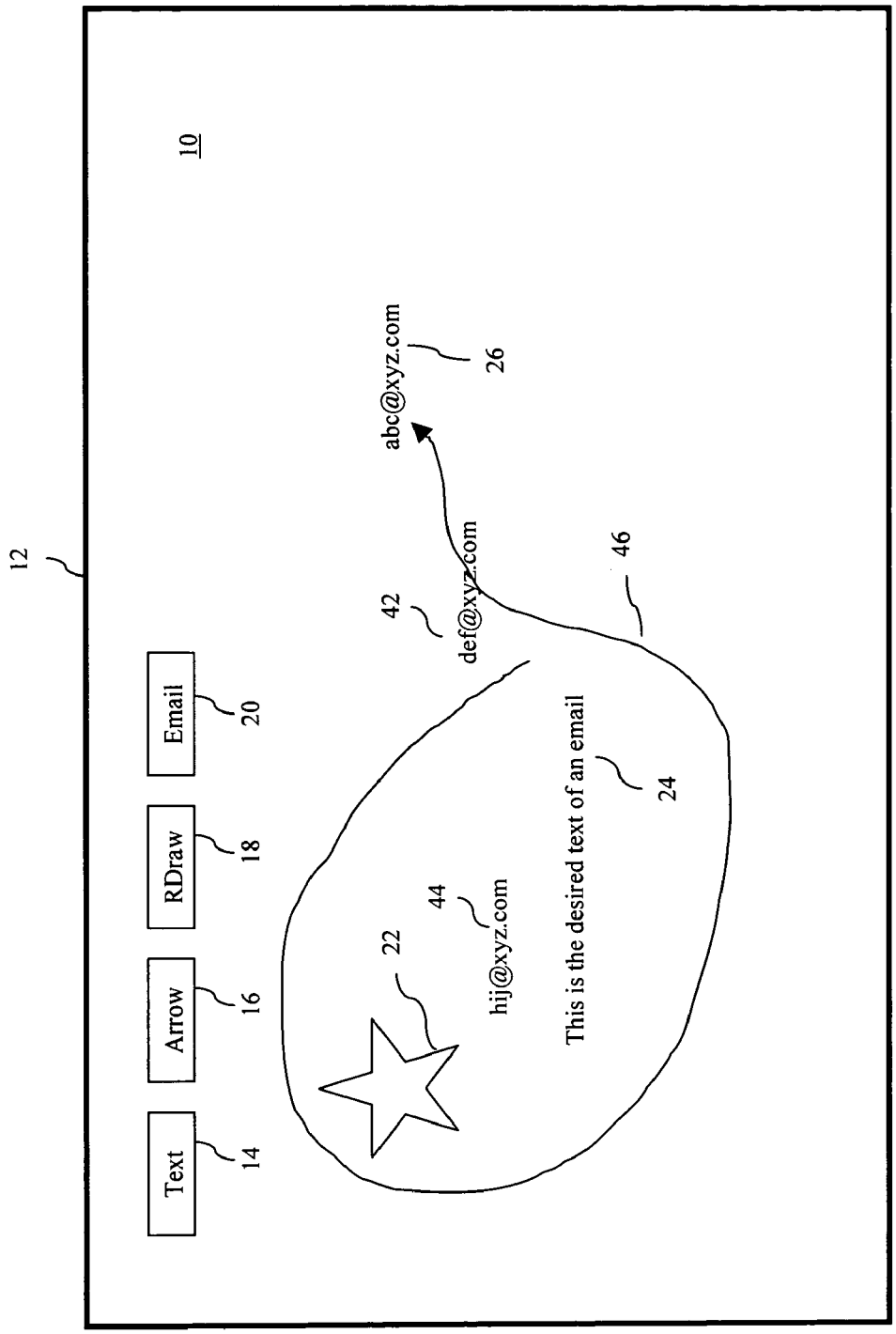
FIG. 5A illustrates drawing of an arrow to send an email to multiple email addresses in accordance with an embodiment of the invention.
Figure 5B:
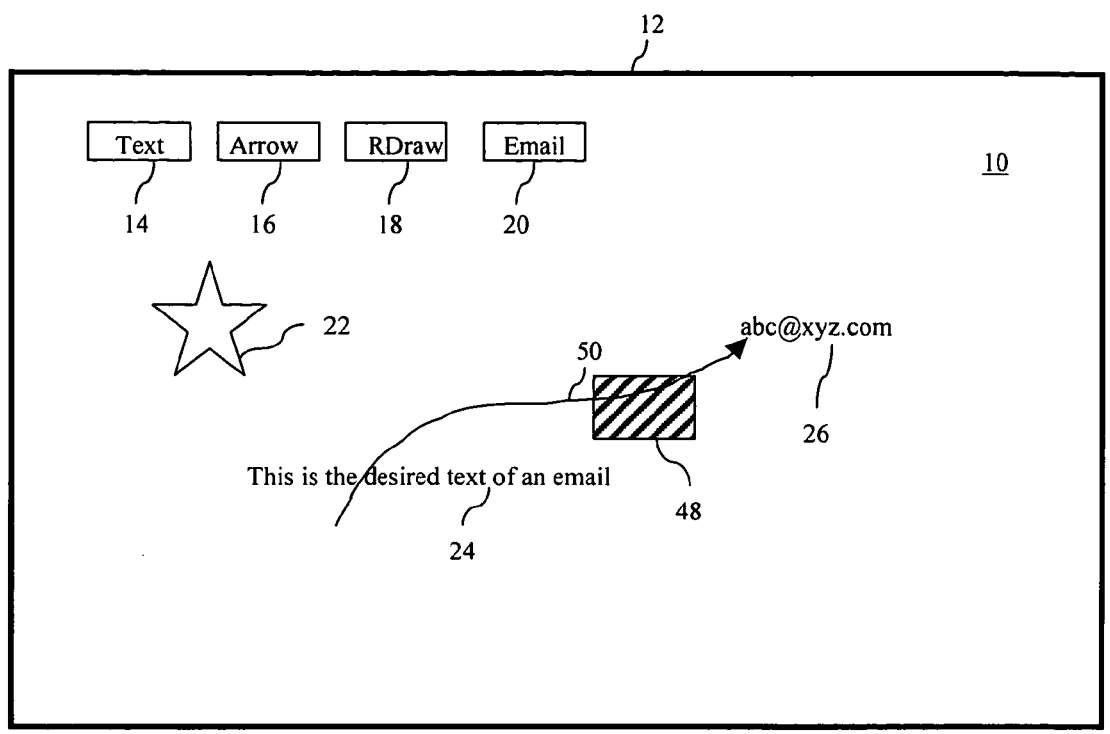
FIG. 5B illustrates drawing of an arrow to send an email to multiple email addresses, including one or more email addresses contained in a rectangular assignment object, in accordance with an embodiment of the invention.
Figure 5C:
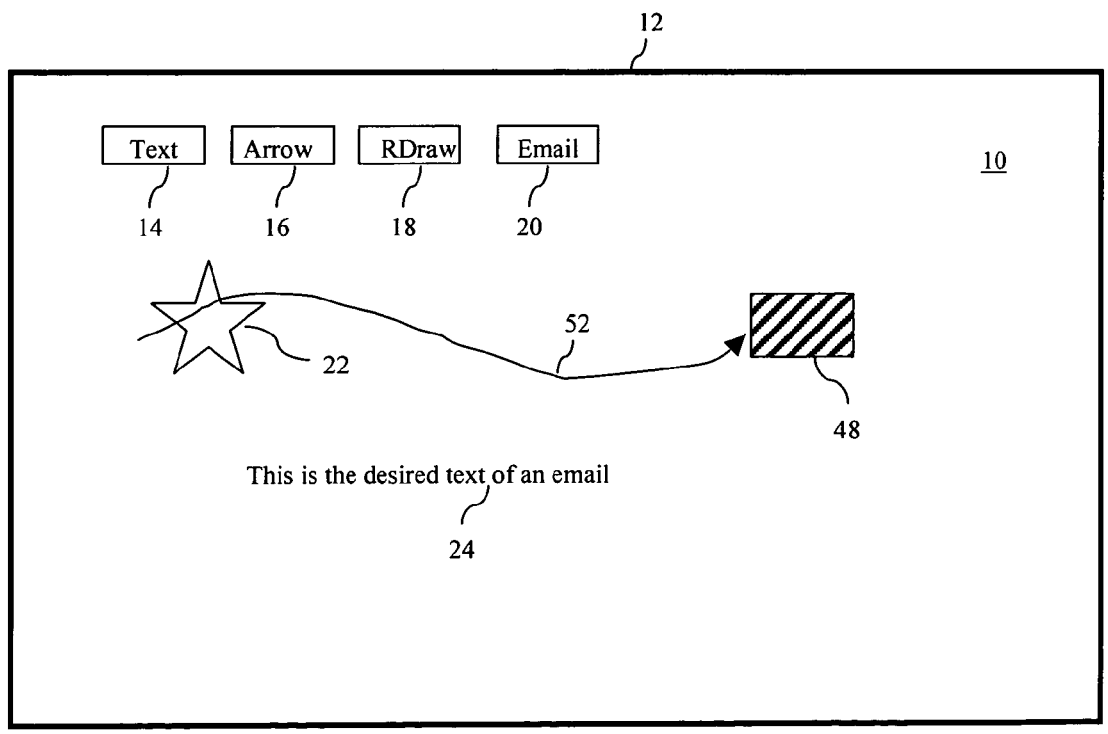
FIG. 5C illustrates drawing of an arrow to send an email to one or more email addresses contained in a rectangular assignment object in accordance with an embodiment of the invention.
Figure 5D:
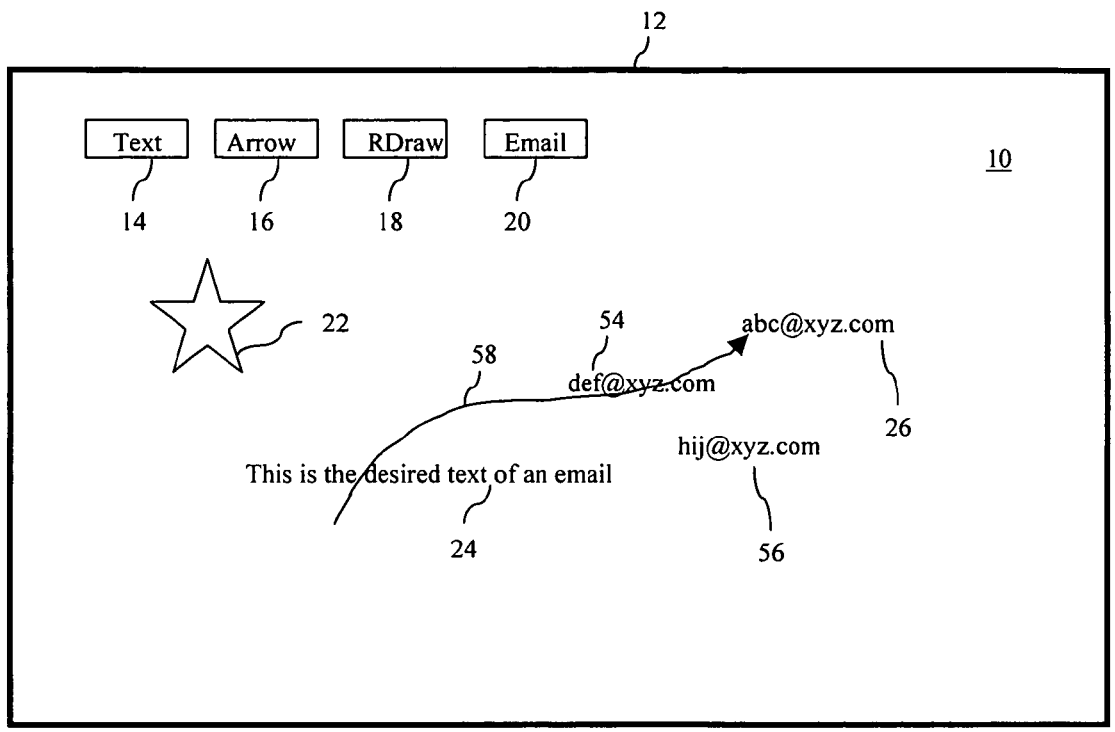
FIG. 5D illustrates drawing of an arrow to send an email to multiple email addresses, including email addresses that have been "glued" together, in accordance with an embodiment of the invention.
Figure 5E:
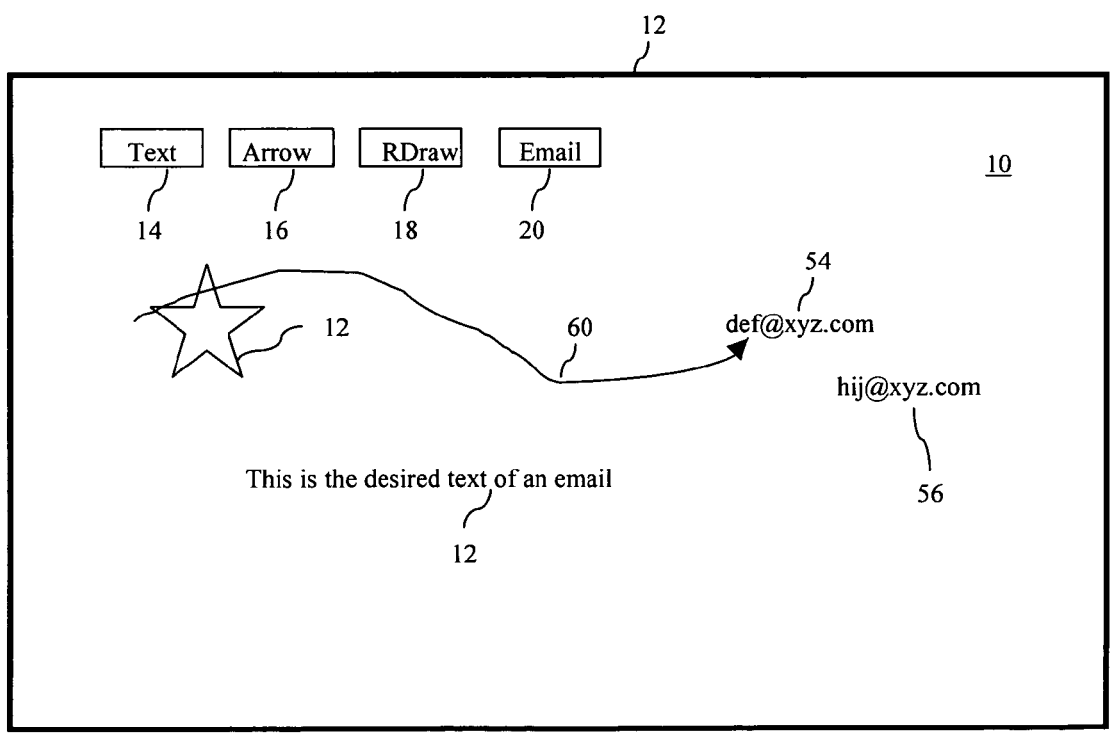
FIG. 5E illustrates drawing of an arrow to send an email to "glued" email addresses contained in accordance with an embodiment of the invention.

If the user wants to send an email to more than one email address, one or more of the following approaches can be used:

1) type one or more additional email addresses in the Blackspace environment 10, e.g., email addresses 42 and 44 in FIG. 5A, and draw an arrow 46 with the arrow logic of "send to" that intersects and/or substantially encircles the email addresses 42 and 44;

2) create an assignment object, e.g., a rectangular assignment object 48, with an assignment of one or more email addresses and draw an arrow 50 with the arrow logic of "send to" that intersects or substantially encircles that assignment object, as illustrated in FIG. 5B. An email can also be sent to the email address(es) of an assignment object, e.g., the rectangular assignment object 48, by drawing an arrow 52 with the arrow logic of "send to" to the assignment object, as illustrated in FIG. 5C. In the example of FIG. 5C, the email will be sent to each email address included in the rectangular object 48; or 3) type one or more additional email addresses in the Blackspace environment 10, e.g., email addresses 54 and 56 in FIG. 5D, glue the email addresses together and then draw an arrow 58 with the arrow logic of "send to" that intersects and/or substantially encircles at least one of the glued email addresses. An email can also be sent to glued email addresses, e.g., the glued email addresses 54 and 56, by drawing an arrow 60 of the arrow logic "send to" to at least one of the glued email addresses, as illustrated in FIG. 5E. In the example of FIG. 5E, the email will be sent to the glued email addresses 54 and 56. In the Blackspace environment 10, email addresses can be glued to any graphic object, even a picture or an image. Thus, one technique to create a list of email recipients is to glue email addresses to a picture of people that correspond to the email recipients. In this example, an email can be sent to all the recipients by simply drawing a "send to" arrow that points to the picture. Alternatively, the email addresses of the desired recipients can be assigned to a single assignment object, such as a star. In this example, an email can be sent to all the recipients by simply drawing a "send to" arrow that points to the star.

Figure 6A:
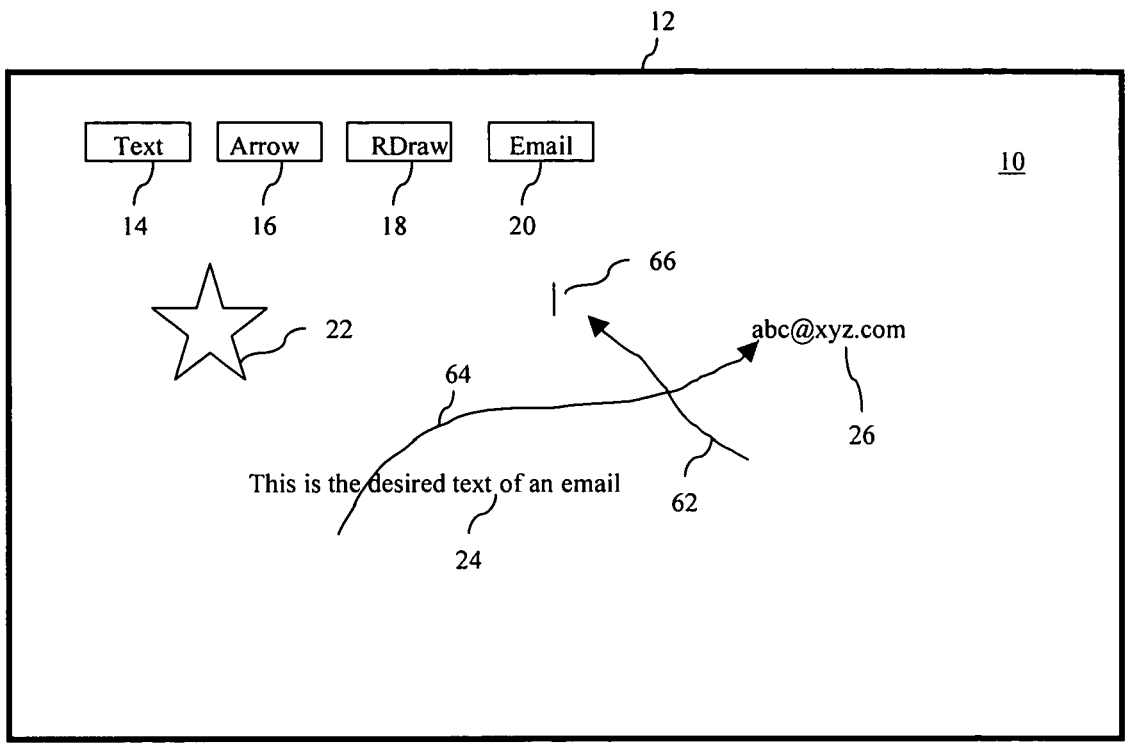
FIGS. 6A and 6B illustrate drawing of a modifier arrow and entering of modifier text to include a title to an email in accordance with an embodiment of the invention.
Figure 6B:
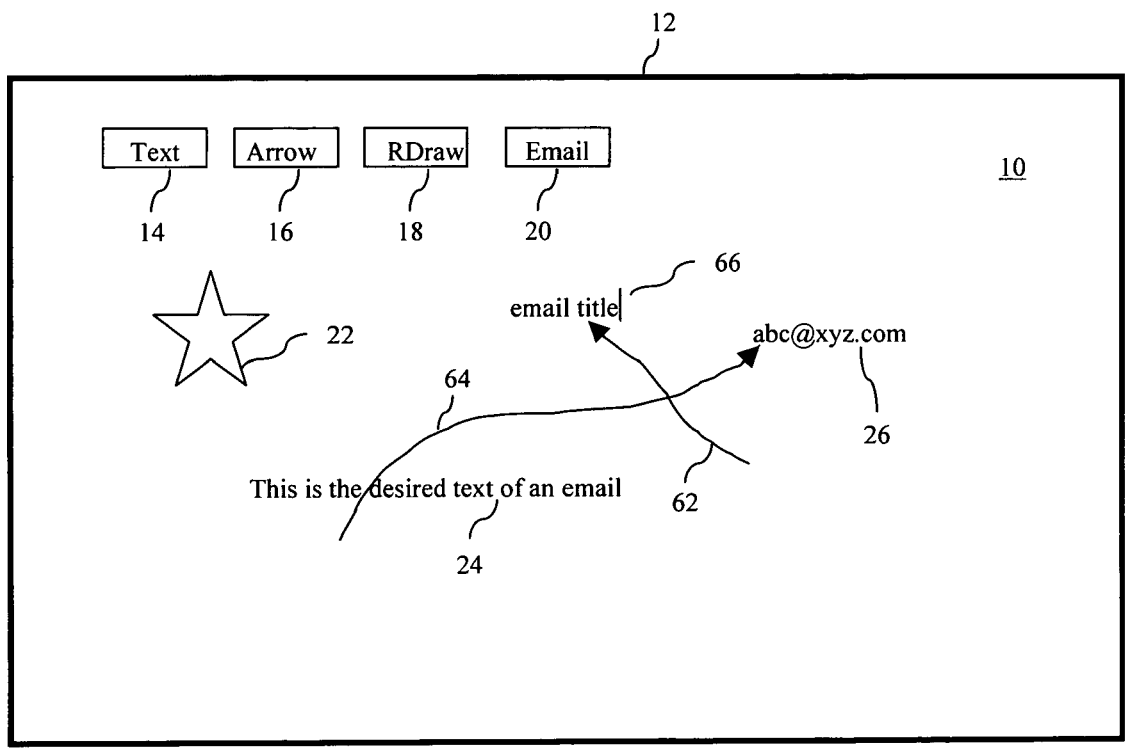

As illustrated in FIG. 6A, a title or subject can be added to an email by simply drawing a second arrow 62 of a particular color (e.g., a second gray arrow) that intersects or touches a first arrow 64 with the arrow logic of "send to" and typing the title near the arrowhead of the second arrow. After the first arrow 64 with the arrow logic of "send to" has been drawn but before that arrow is activated to send an email, the user can draw the second arrow 62 (referred to herein as a "modifier arrow") that intersects or touches any part of the first arrow. When the second arrow 62 is recognized as a modifier arrow, a graphic indication of this state is displayed. As an example, the arrowhead of the second arrow 62 may turn white. When the modifier arrow 62 is recognized, a text cursor 66 will appear near the arrowhead of the modifier arrow, as shown in FIG. 6A, so that the user can type the desired title for the email, e.g., the text of "email title", as shown in FIG. 6B. The exact position of the text cursor 66, and consequently, the typed title can be located anywhere in the Blackspace environment 10, although an appropriate position is near the modifier arrow 62. When the first arrow 64 or the modifier arrow 62 is activated, an email with the typed title is transmitted to the specified recipient(s). In the case where no text (including numbers, symbols or other graphics) is entered for the modifier arrow 62, the modifier arrow is ignored, which will result in a blank title or a default title for the email.

Figure 7A:
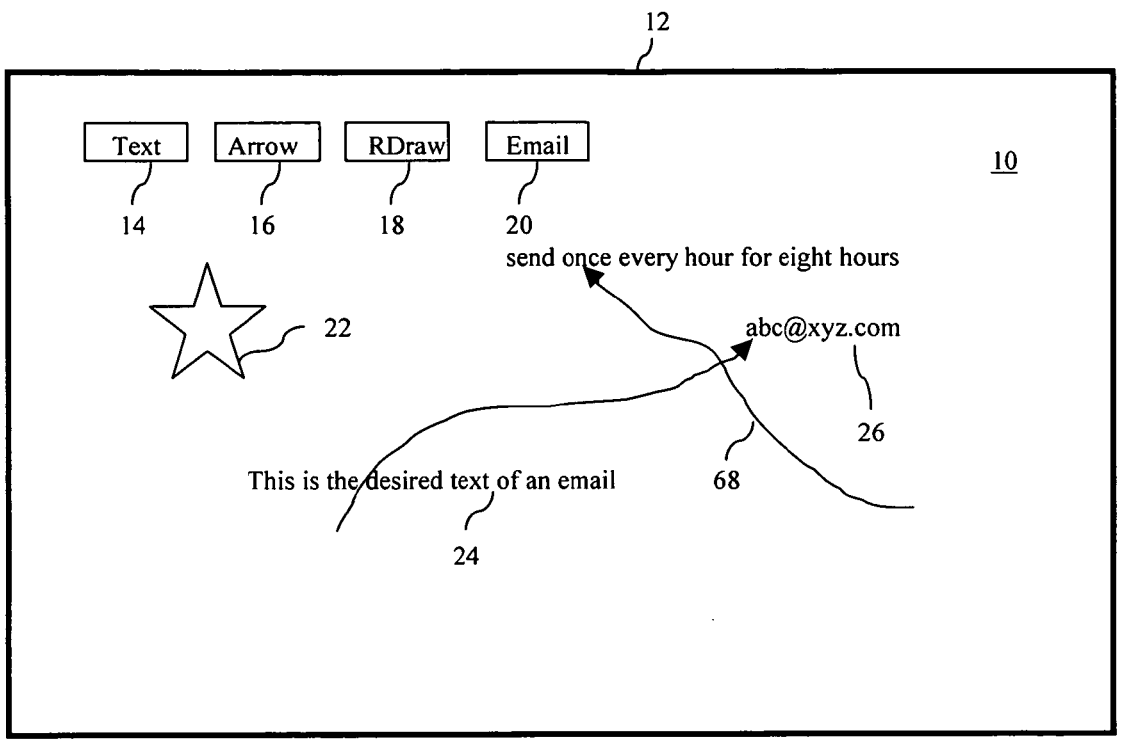
FIG. 7A illustrates drawing of a modifier arrow and entering of modifier text to modify a sending operation of an email in accordance with an embodiment of the invention.
Figure 7B:
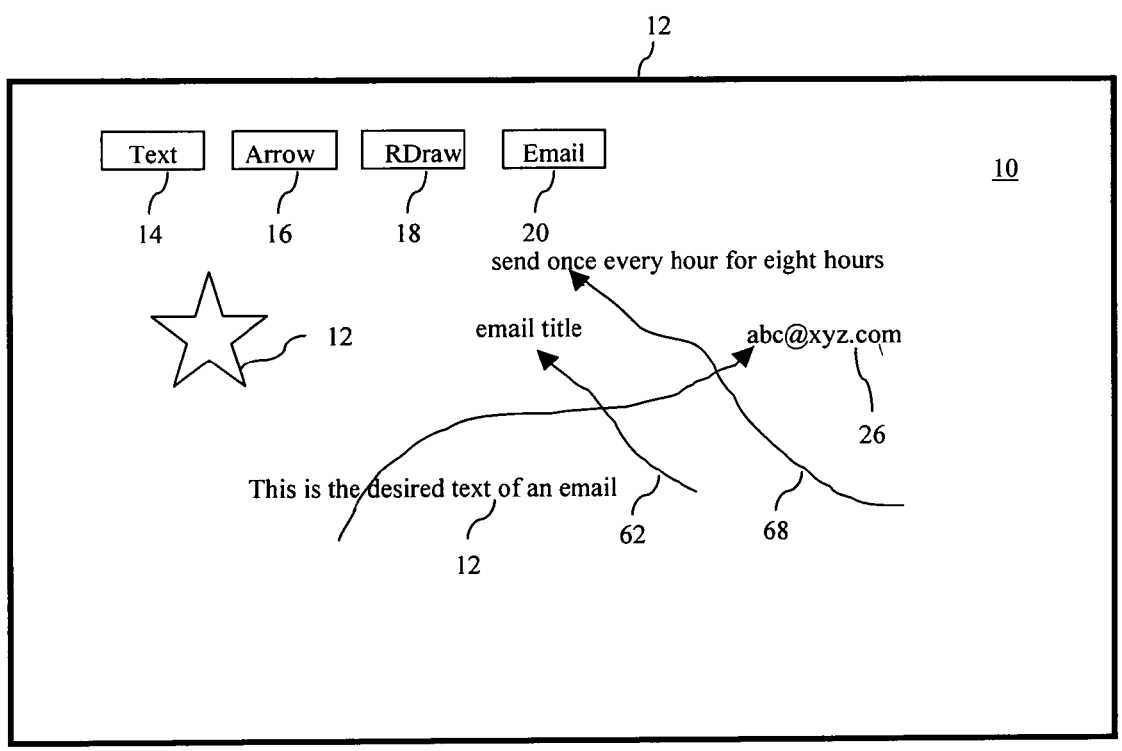
FIG. 7B illustrates using two modifier arrows to include a title to an email and to modify a sending operation of the email in accordance with an embodiment of the invention.

In an embodiment, a modifier arrow also may be used to modify the delivery or sending operation of an email. As an example, a modifier arrow 68 may be used to repeatedly send an email to one or more recipients, e.g., once every hour for eight hours, as illustrated in FIG. 7A. As another example, a modifier arrow may be used to send an email on a specific date of the year for eight years. The modifier arrow 68 for modifying the delivery of an email may be used in conjunction with the modifier arrow 62 for entering the title, as illustrated in FIG. 7B. These modifier arrows may differ in appearance, such as color, so that the modifier arrows are not confused with respect to purpose. For example, the modifier arrow for modifying the email delivery may be a green arrow and the modifier arrow for email title may be a gray arrow.

Figure 8A:
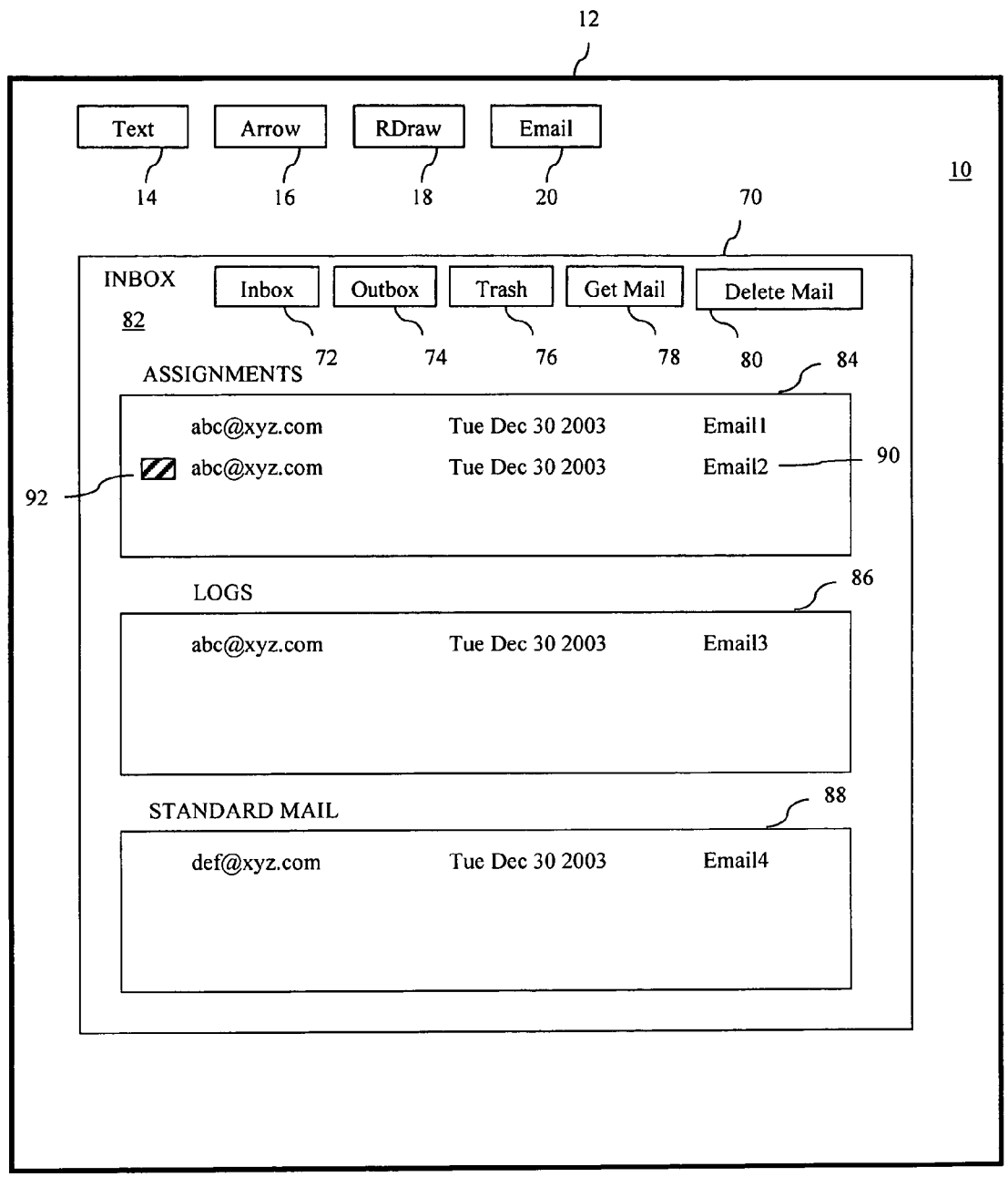
FIG. 8A shows an inbox folder of a mailbox in accordance with an embodiment of the invention.

Turning now to FIG. 8A, a mailbox 70 for managing emails in accordance with an embodiment of the invention is shown. The mailbox 70 can be made to appear onscreen by activating the email switch 20. The mailbox 70 includes an inbox folder switch 72, an outbox folder switch 74 and a trash folder switch 76, as well as "get mail" and "delete mail" switches 78 and 80. In FIG. 8A, the inbox folder 82 is opened. As shown, the inbox folder includes an "assignments" subfolder 84, a "logs" subfolder 86 and a "standard mail" subfolder 88. These subfolders are used to categorize received emails. Received emails with assignment objects are placed in the "assignments" subfolder 84, while received emails with logs are placed in the "logs" subfolder 86. Other types of received emails (i.e., standard email) are placed in the "standard email" subfolder 88. Although not shown, the trash folder is similar to the inbox 82, except the trash folder includes deleted emails.

For each received email, an email entry of the sender (e.g., email address of the sender), the received date, and the title of the email is displayed in the inline of that email, as illustrated in FIG. 8A. The inline is the line of information displayed in one of the subfolders 84, 86 and 88 for a particular type of email. In addition to the sender, date and the title, for each received email with a single assignment object, the assignment object of that email is also displayed in the respective inline, as illustrated by an email entry 90 with a rectangular assignment object 92. An assignment object displayed in an inline is not just a visual representation of the original assignment object but a complete working replica of the original assignment object such that all the assigned information of the original assignment object is included in the inline-displayed assignment object. Thus, an inline-displayed assignment object of an email can be used immediately in the Blackspace environment 10 by, for example, copying or moving the assignment object onto the global surface of the Blackspace environment. In the inbox 82, the mail entries are highlighted when the received emails have not been opened. Note: when an email with a log is received and the log is loaded into the Blackspace environment 10, the entire Blackspace environment is changed to the saved system state as represented by the log.

Figure 8B:
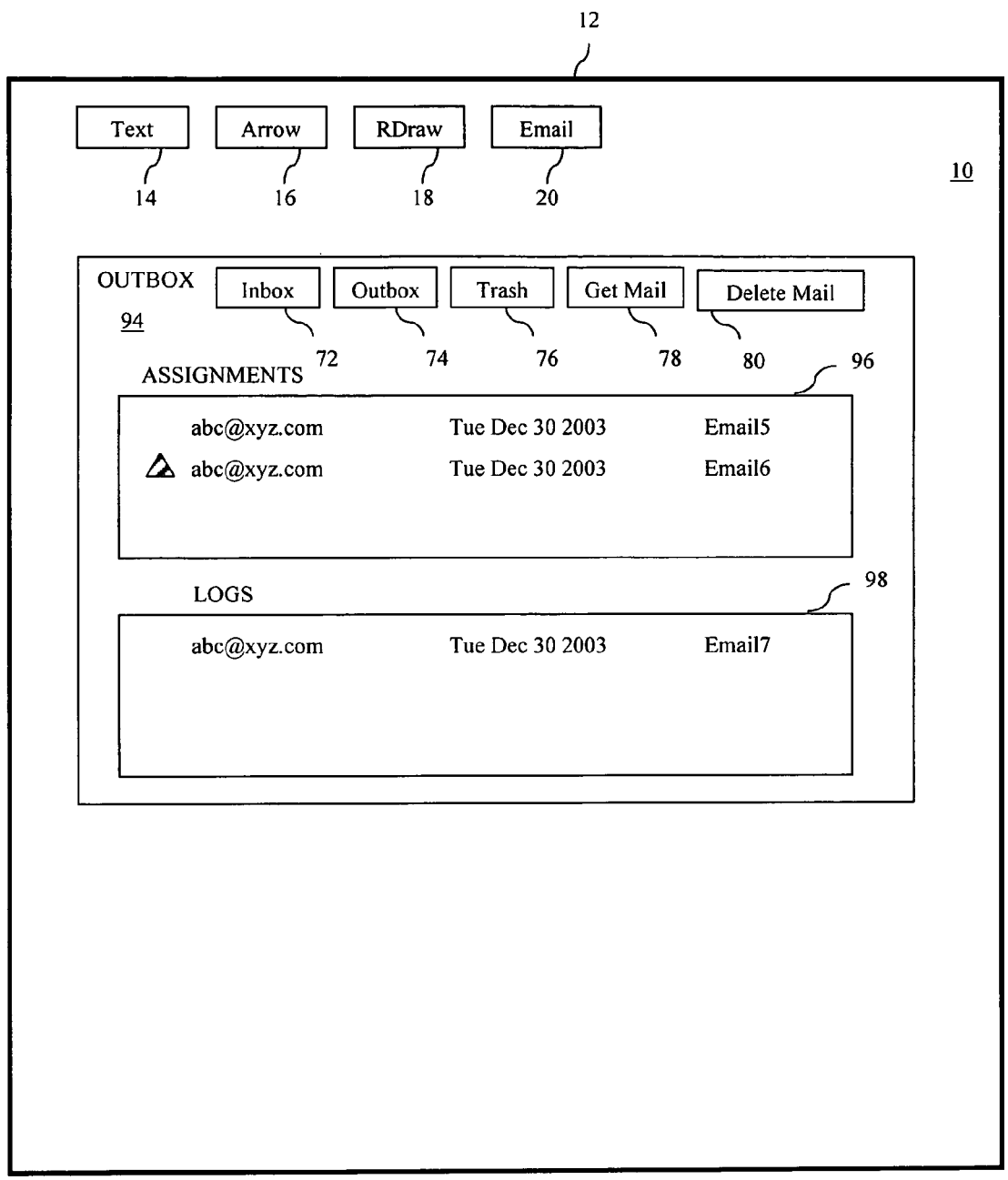
FIG. 8B shows an outbox folder of a mailbox in accordance with an embodiment of the invention.

As shown in FIG. 8B, the outbox folder 94 of the mailbox 70 includes "assignments" and "log" subfolders 96 and 98. Outgoing emails with assignment objects are placed in the "assignments" subfolder 96, while outgoing emails with logs are placed in the "logs" subfolder 98. For each outgoing email, the recipient(s) (e.g., email addresses of the recipients), sent date and the title of the email are displayed in the inline of that email, as illustrated in FIG. 8B. Similar to the received emails, for each outgoing email with a single assignment object, the assignment object of that email is also displayed in the respective inline. Furthermore, the email entry for an outgoing email is highlighted when the outgoing email has not yet been sent.

Figure 9A:
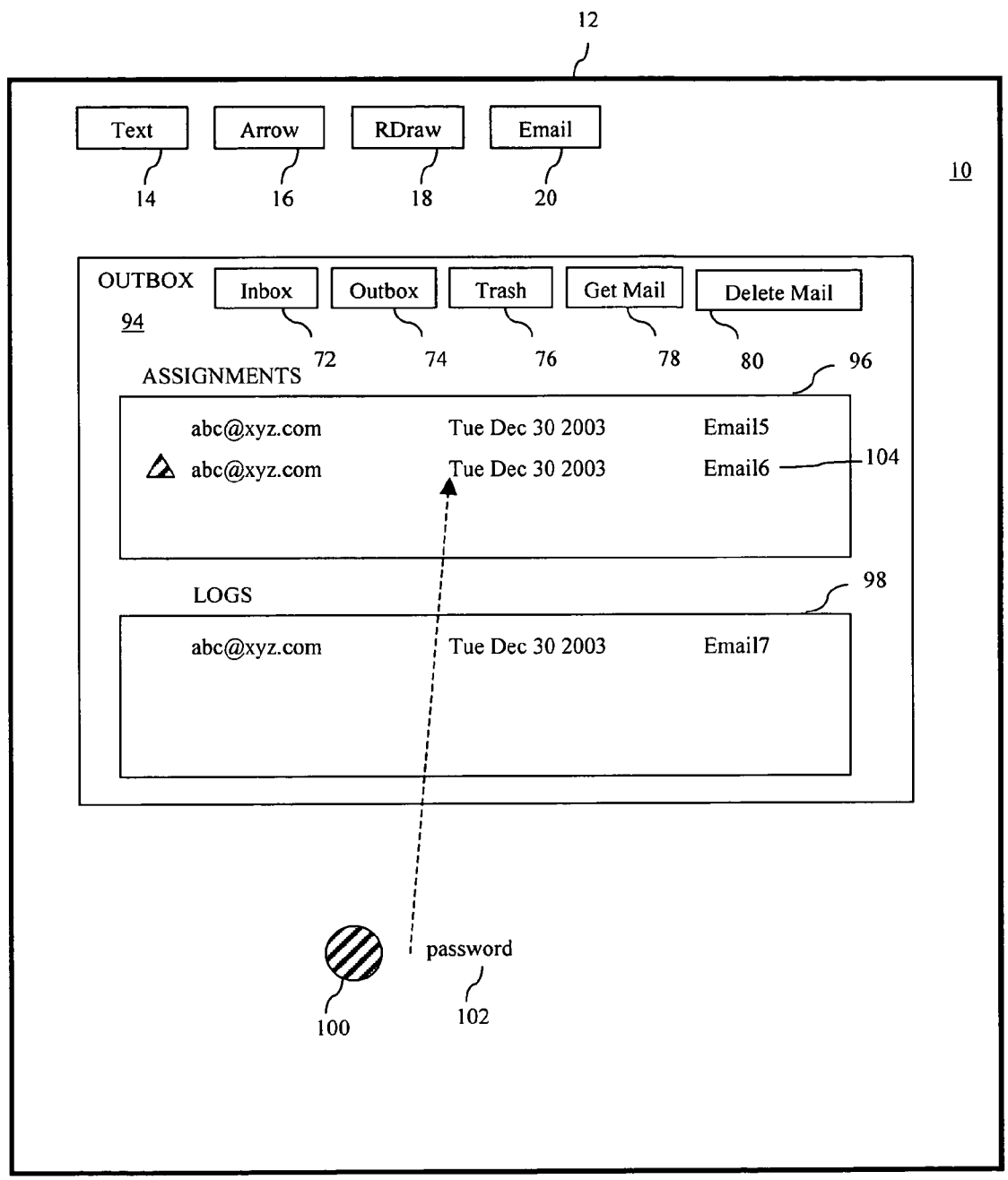
FIG. 9A illustrates securing of an email using a password object in accordance with an embodiment of the invention.
Figure 9B:
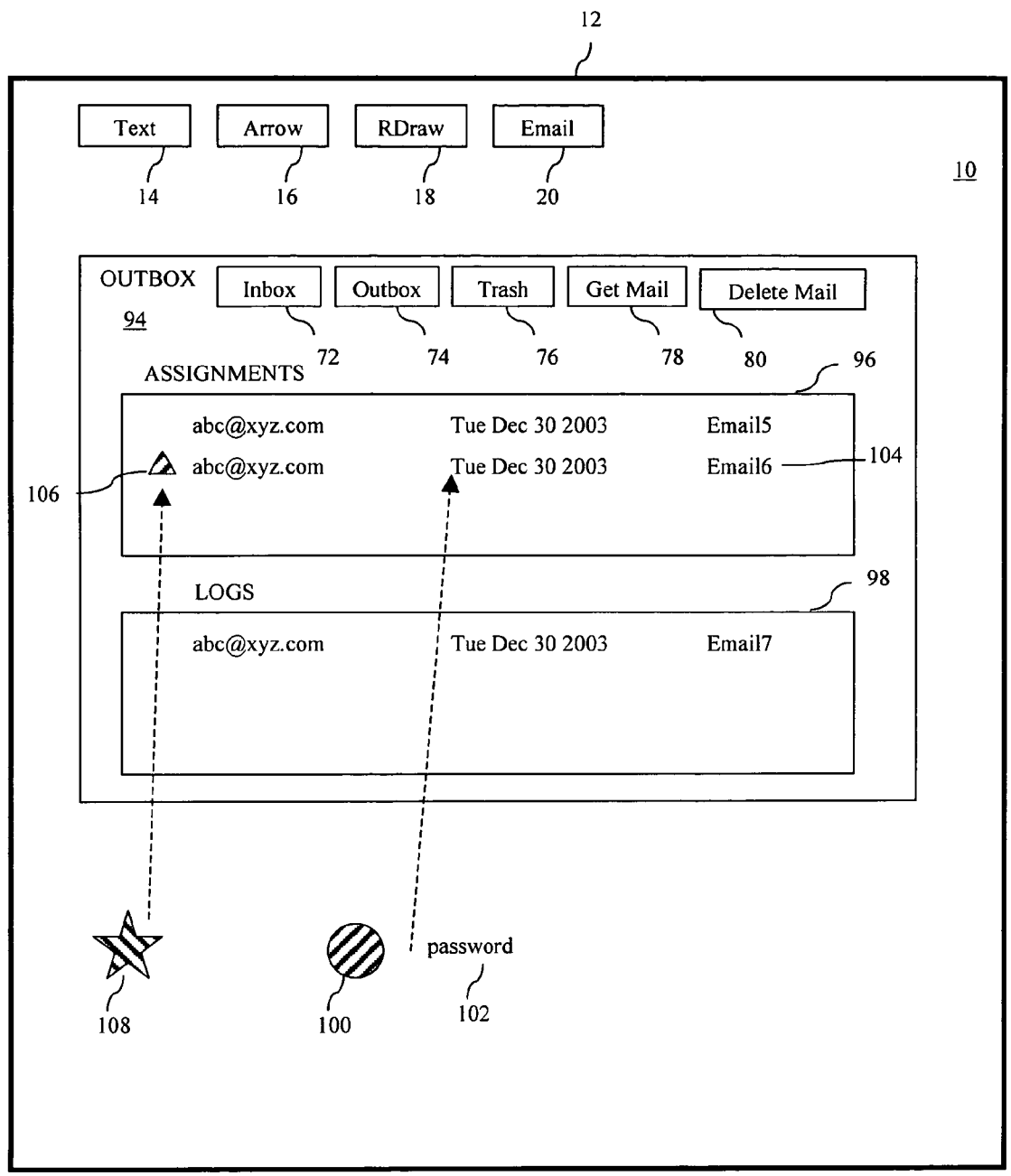
FIG. 9B illustrates securing of an assignment object of an email using a first password object and securing the email using a second password object in accordance with an embodiment of the invention.

In an embodiment, any outgoing email can be secured with one or more password objects. A password object may be one or more graphic objects, including text objects and assignment objects. An assignment object of a password object may further include an assignment object and so on. Thus, a password object can be made to be as complex as a user desires. An email can be secured or "locked" using a password object by simply moving the password object to an email entry of the email displayed in the outbox folder 94. As an example illustrated in FIG. 9A, a circular assignment object 100 and a text object 102 of "password" can be glued to form a password object and then moved over an email entry 104. The email as represented by the email entry 104 is then secured by the password object, which in this case is both the circular assignment object 100 and the text object 102 of "password". Once secured, an email can only be opened by the password object used to secure that email. A secured email is opened by moving the required password object over the email entry of that email. In addition to securing of the entire email, each assignment object included in the email as part of a log or otherwise can also be secured by the same or different password object. As an example illustrated in FIG. 9B, the triangular assignment object 106 of the email represented by the email entry 90 may be first secured by a password object of a star 108. Thus, multiple password objects can be used to secure different parts or levels of an email, where each part or level of the email is secured by a unique password object. For more information about password objects, see pending U.S. patent application Ser. No. 10/635,883 entitled "Method for Creating and Using Computer Passwords", filed on Aug. 5, 2003, which is incorporated herein by reference.

The use of password objects for emails may also be used to filter and sort received emails. The email filtering can be achieved by automatically placing received emails without an approved password object into the trash folder. The approved password object may be one specific password object or one of many approved password objects. Since spam emails will not have an approved password object, the email filtering can be used to effectively block spam emails. The email sorting can be achieved by automatically placing received emails into different subfolders of the inbox folder according to the password objects of the emails. As an example, received emails with a first password object may be placed in a "personal" subfolder of the inbox folder and received emails with a second password object may be placed in a "business" subfolder of the inbox folder. In this fashion, received emails can be sorted into different types of emails. The described email filtering and sorting can both be used to filter unwanted emails and to sort wanted emails according to password objects.

Figure 10:
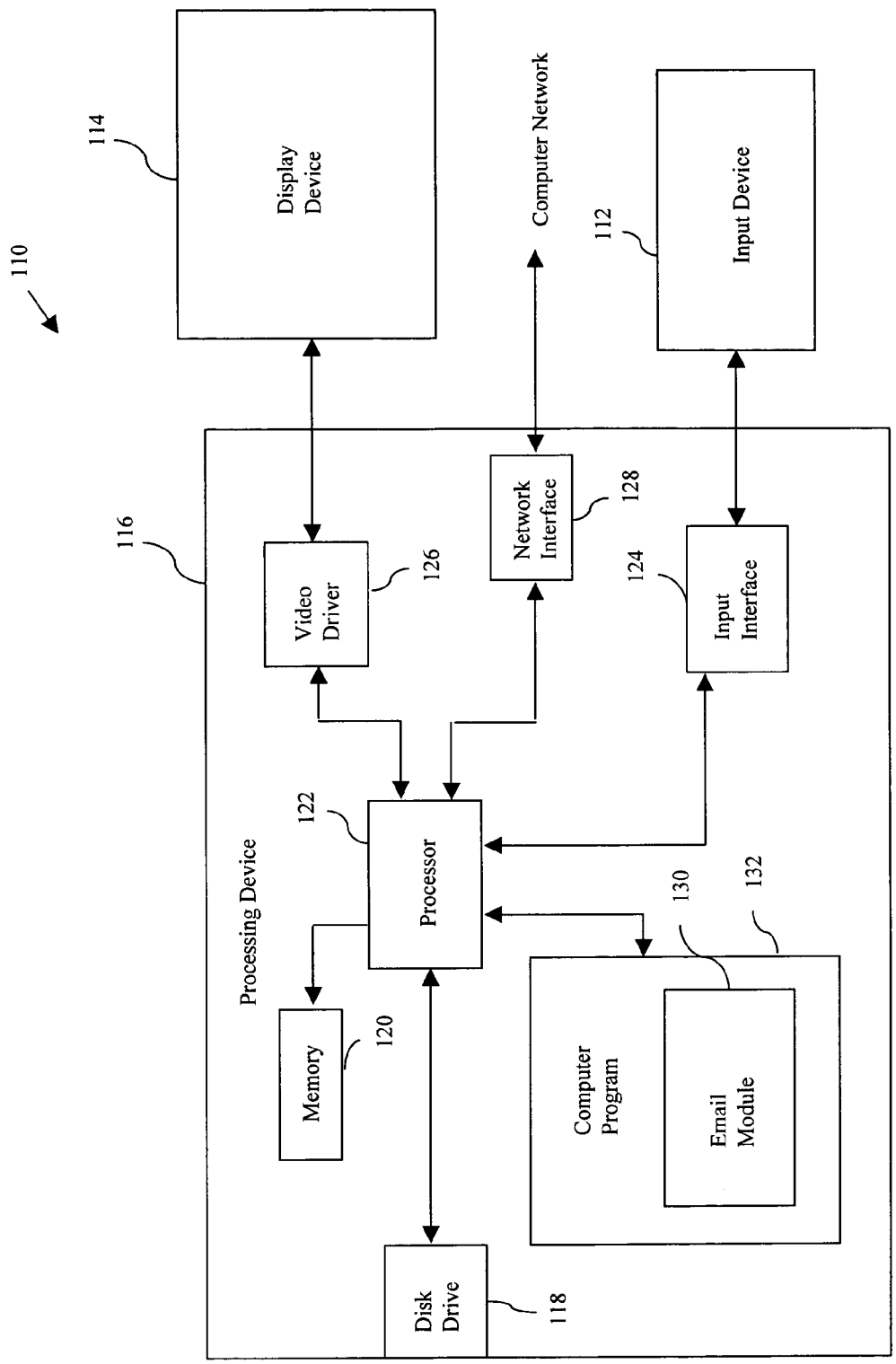
FIG. 10 shows a system for sending and receiving emails in accordance with an embodiment of the invention.

Turning now to FIG. 10, a computer system 110 for sending and receiving emails in accordance with an embodiment of the invention is shown. The computer system 100 may be a personal computer, a personal digital assistant (PDA) or any computing system with a display device. As shown in FIG. 10, the computer system 110 includes an input device 112, a display device 114 and a processing device 116. Although these devices are shown as separate devices, two or more of these devices may be integrated together. The input device 112 allows a user to input commands into the system 110 to, for example, enter email addresses and draw "send to" arrows to send emails. The input device 112 may include a computer keyboard and a mouse. However, the input device 112 may be any type of electronic input device, such as buttons, dials, levers and/or switches on the processing device 116. Alternative, the input device 112 may be part of the display device 114 as a touch-sensitive display that allows a user to input commands using a stylus. The display device 114 may be any type of a display device, such as those commonly found in personal computer systems, e.g., CRT monitors or LCD monitors.

The processing device 116 of the computer system 110 includes a disk drive 118, memory 120, a processor 122, an input interface 124, a video driver 126, and a network interface 128. The processing device 116 further includes an email module 130, which performs operations related to sending and receiving emails. As shown in FIG. 10, the email module 130 may be implemented as part of a computer program 132, e.g., a Blackspace program that provides a Blackspace operating environment. In one embodiment, the email module 130 is implemented as software. However, the email module 130 may be implemented in any combination of hardware, firmware and/or software.

The disk drive 118, the memory 120, the processor 122, the input interface 124, the video driver 126 and the network interface 128 are components that are commonly found in personal computers. The disk drive 118 provides a means to input data and to install programs into the system 110 from an external computer readable storage medium. As an example, the disk drive 118 may a CD drive to read data contained therein. The memory 120 is a storage medium to store various data utilized by the computer system 110. The memory 120 may be a hard disk drive, read-only memory (ROM) or other forms of memory. The processor 122 may be any type of digital signal processor that can run the computer program 132, including the email module 130. The input interface 124 provides an interface between the processing device 116 and the input device 112. The video driver 126 drives the display device 114. The network interface 128 provides an interface between the computer system 110 and a computer network, such as the Internet. In order to simplify the figure, additional components that are commonly found in a processing device of a personal computer system are not shown or described.

Figure 11A:
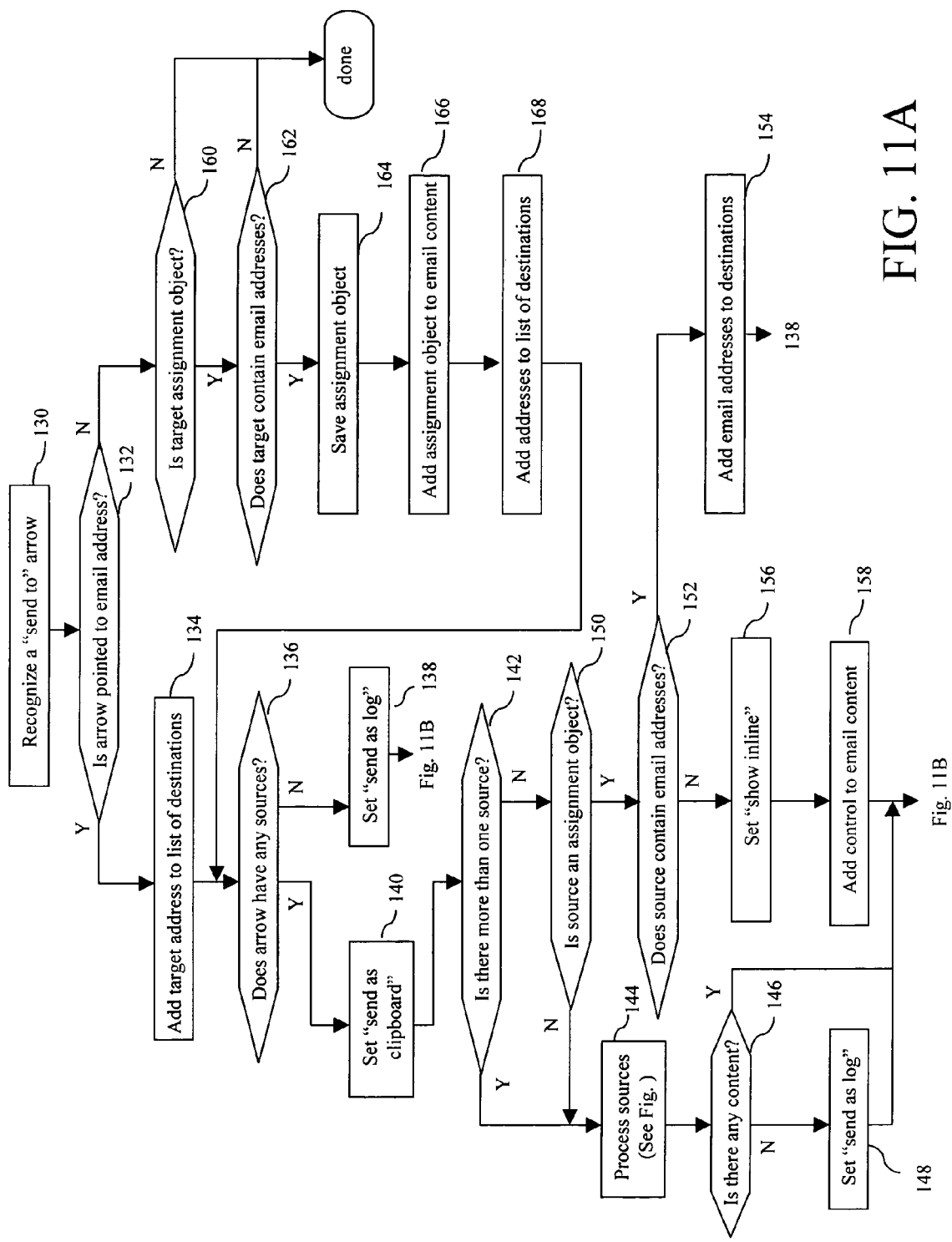
Figure 12:
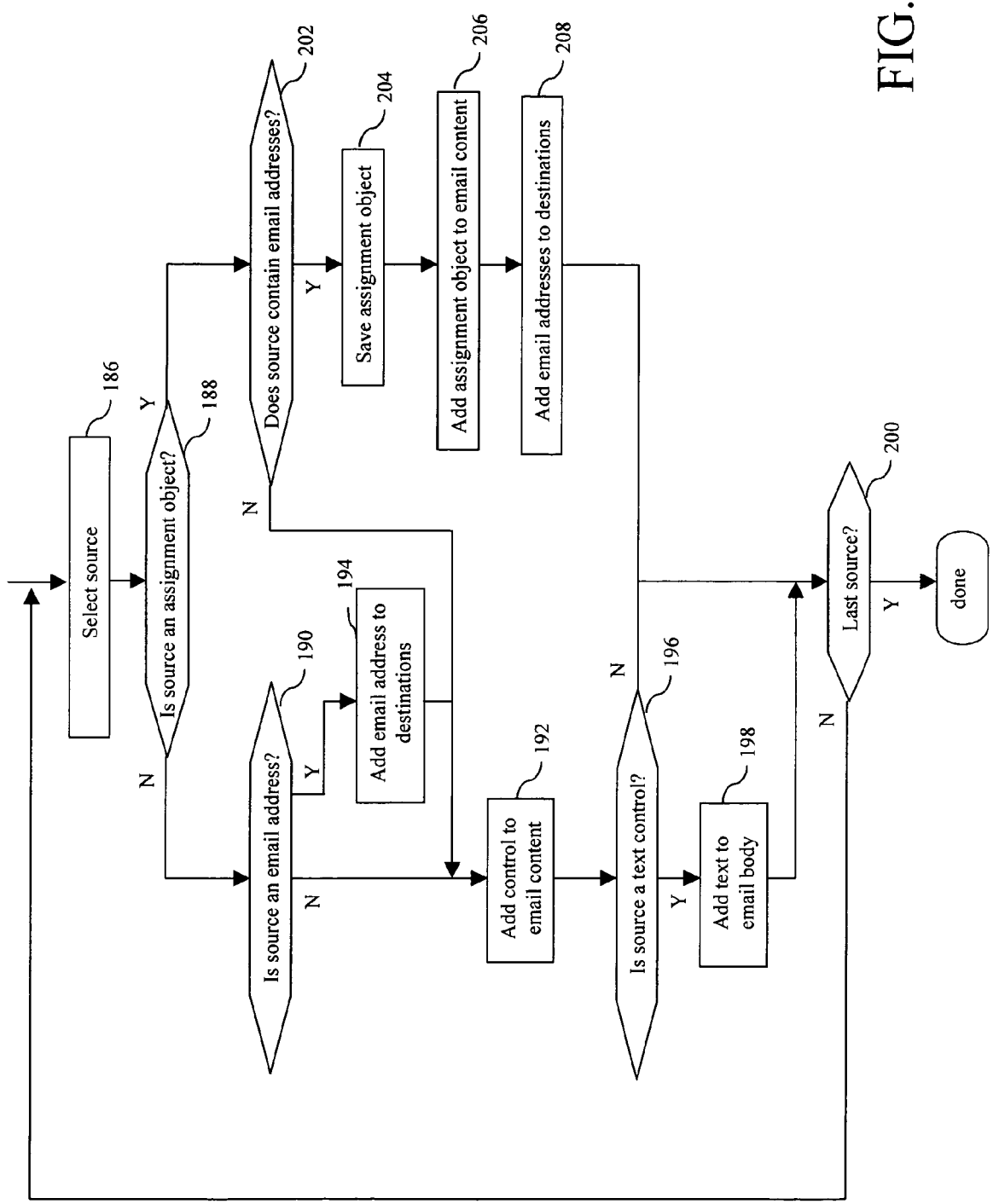
FIG. 12 shows a flow chart for processing sources of a "send to" arrow in accordance with an embodiment of the invention.
Figure 13:
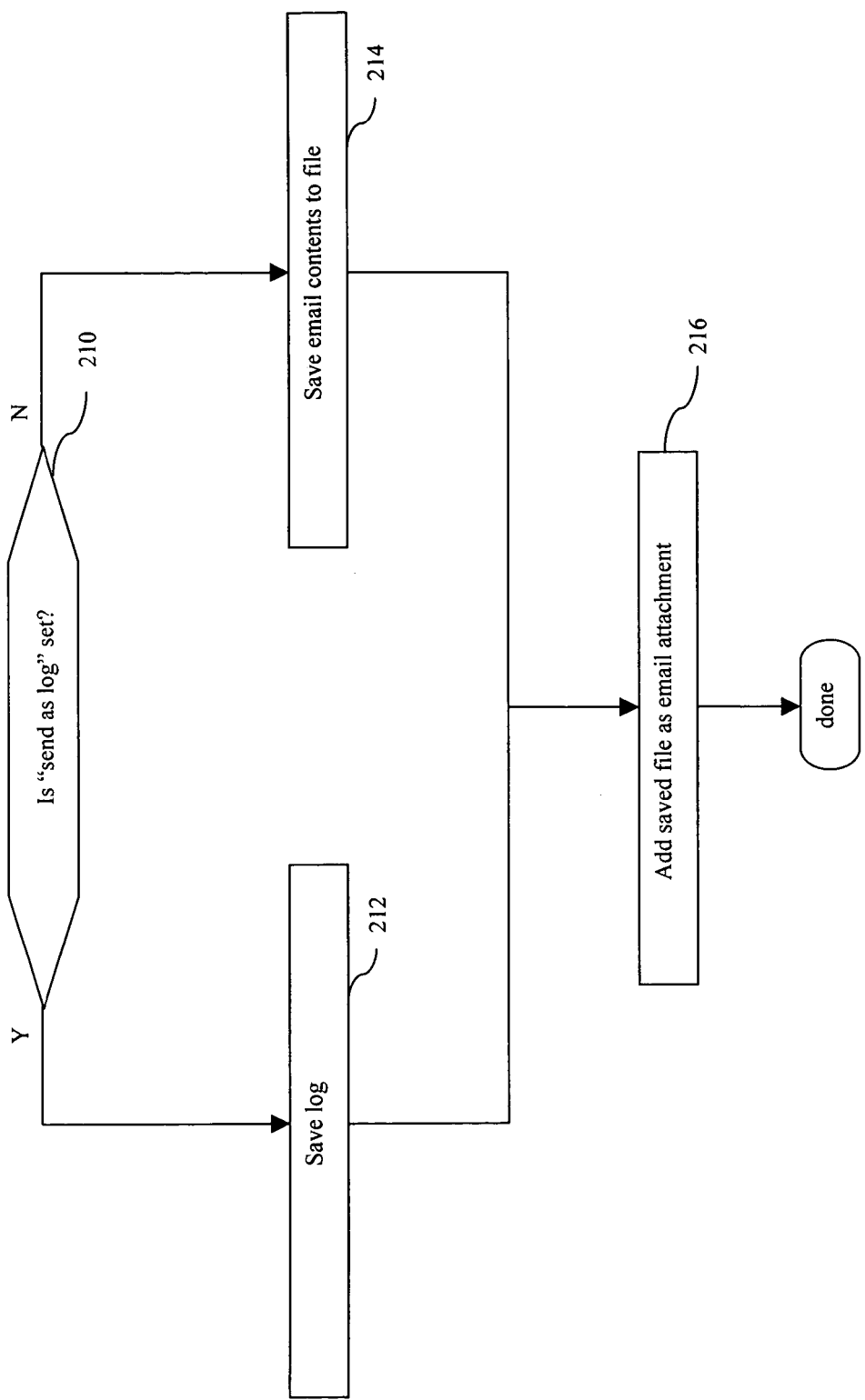
FIG. 13 shows a flow chart for constructing an email in accordance with an embodiment of the invention.

Various operations performed by the email module 130 to send and received emails are described with reference to flow charts of FIGS. 11–14. FIGS. 11A and 11B show a flow chart of a process for sending an email in accordance with an embodiment of the invention. At block 130, a "send to" arrow drawn by the user is recognized. Next, at block 132, a determination is made whether the arrow is pointing to an email address. If yes, then the target address is added to a list of destinations for the email, at block 134. Next, at block 136, a determination is made whether the arrow have any sources. If no, then a "send as log" flag is set, at block 138, and the process proceeds to block shown in FIG. 11B. If yes, then a "send as clipboard" flag is set, at block 140.

Next, at block 142, a determination is made whether there is more than one source. If yes, the sources are processed, at block 144. The manner in which the sources are processed is described with reference to FIG. 12. At block 186, one of the sources is selected to be processed. Next, at block 188, a determination is made whether the selected source is an assignment object. If no, then a determination is made whether the selected source is an email address, at block 190. If no, then a control for this source is added to the email content, at block 192. If the source is an email address, then the email address is added the destinations for this email, at block 194, and the process proceeds to block 192.

Next, at block 196, a determination is made whether the source is a text control, i.e., a text object. If yes, then the text of the text control is added to the email body, at block 198. Next, at block 200, a determination is made whether the current source is the last source. If yes, then the process is done. If no, the process proceeds back to block 186, where another source is selected to be processed. If the source is determined not to be a text control at block 196, then the process proceeds to block 200.

Referring back to block 188, if the source is an assignment object, then a determination is made whether the source contains one or more email addresses, at block 202. If no, then the process proceeds to block 192. If yes, then the assignment object is saved, at block 204. Next, at block 206, the assignment object is added to the email content. Next, at block 208, the email addresses of the assignment object are added to destinations and the process proceeds to block 200.

Turning back to FIG. 11A, after the sources are processed at block 144, a determination is made whether there is any content, at block 146, i.e., whether there is anything other anything else besides email addresses. If no, then a "send as log" flag is set, at block 148, and the process proceeds to block 170 in FIG. 11B. If yes, then the process proceeds directly to block 170 in FIG. 11B.

Referring back to block 142, if there is only one source, then a determination is made whether the source is an assignment object, at block 150. If no, then the process proceeds to block 144. If yes, then a determination is made whether the source contains one or more email addresses, at block 152. If yes, then the email addresses are added to destinations of the email, at block 154, and the process proceeds back to block 138. If no, then a "show inline" flag is set, at block 156. Next, at block 158, the control for the source is added to the email content and then the process proceeds to block 170 in FIG. 11B.

Referring back to block 132, if the arrow is not pointing to an email address, then a determination is made whether the target is an assignment object, at block 160. If no, then the process is done. If yes, then a determination is made whether the target contains one or more email addresses, at block 162. If no, then the process is done. If yes, then the assignment object is saved, at block 164. Next, at block 166, the assignment object is added to the email content. Next, at block 168, the email addresses are added to the destinations of the email and the process proceeds to block 136.

Turning now to FIG. 11B, at block 170, a determination is made whether the arrow has a modifier arrow. If yes, then the modifier text (i.e., the entered text near the modifier arrow) is set as the title of the email, at block 172. If no, then a default title is constructed for the email, at block 174. Alternatively, at block 174, the title of the email may be left blank. Next, at block 176, the email is constructed. The manner in which the email is constructed is described with reference to FIG. 13. At block 210, a determination is made whether the "send as log" flag is set. If yes, then a log of the current system state of the Blackspace environment is saved, at block 212. If no, then the email contents are saved to a file, at block 214. Next, at block 216, the saved file is saved as an attachment of the email and the process is done.

Turning back to FIG. 11B, after the email is constructed, a determination is made whether the email should be sent immediately, at block 178. If yes, then the email is sent, at block 180, and the process proceeds to block 182. If no, then the process proceeds directly to block 182. At block 182, a determination is made whether the outbox folder of the mailbox is visible (onscreen). If no, then the process exits. If yes, the email is added to the outbox folder, at block 184, and then the process comes to an end.

Figure 14:
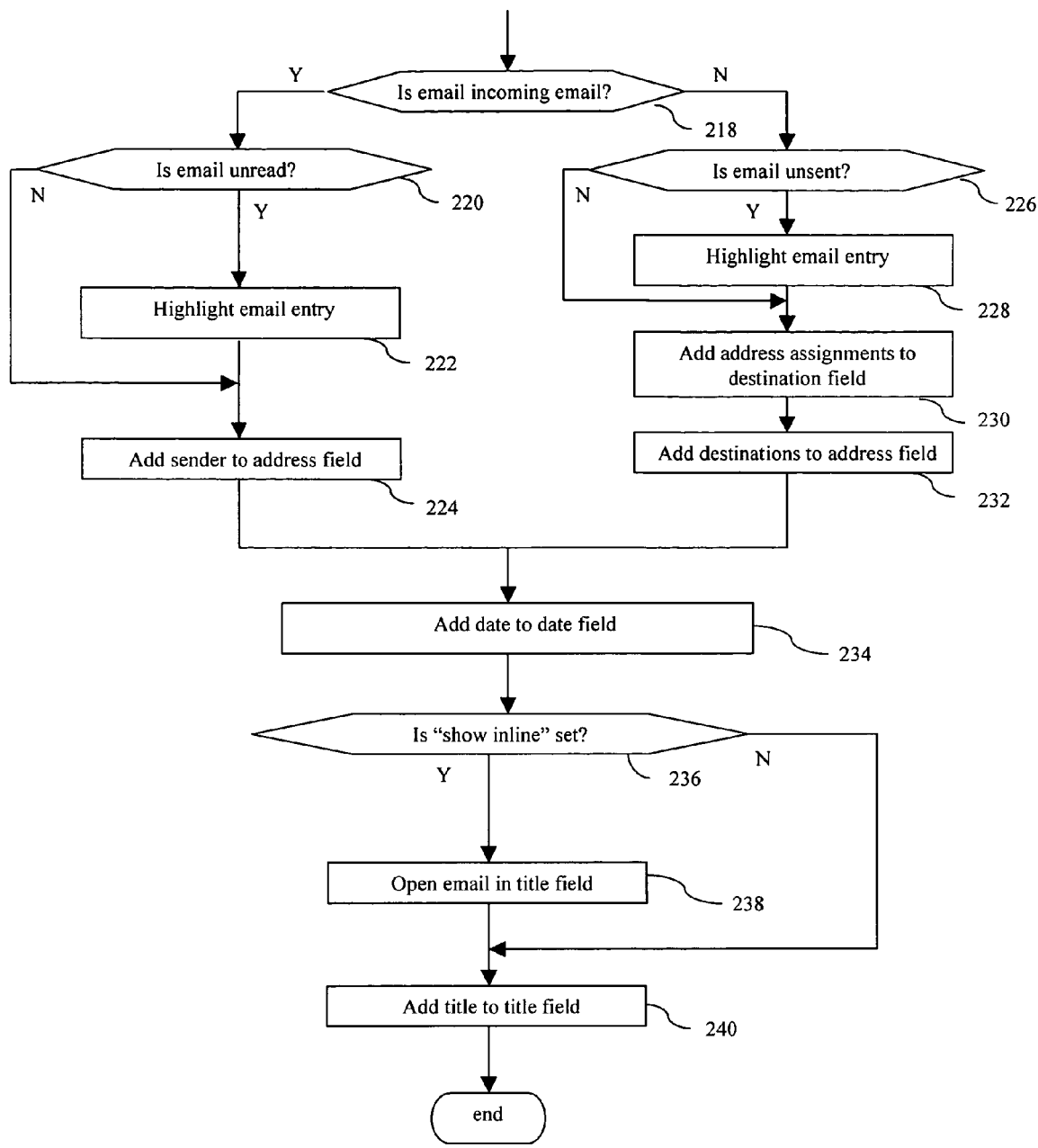
FIG. 14 shows a flow chart for constructing an email entry for an email in accordance with an embodiment of the invention.
Figure 15:
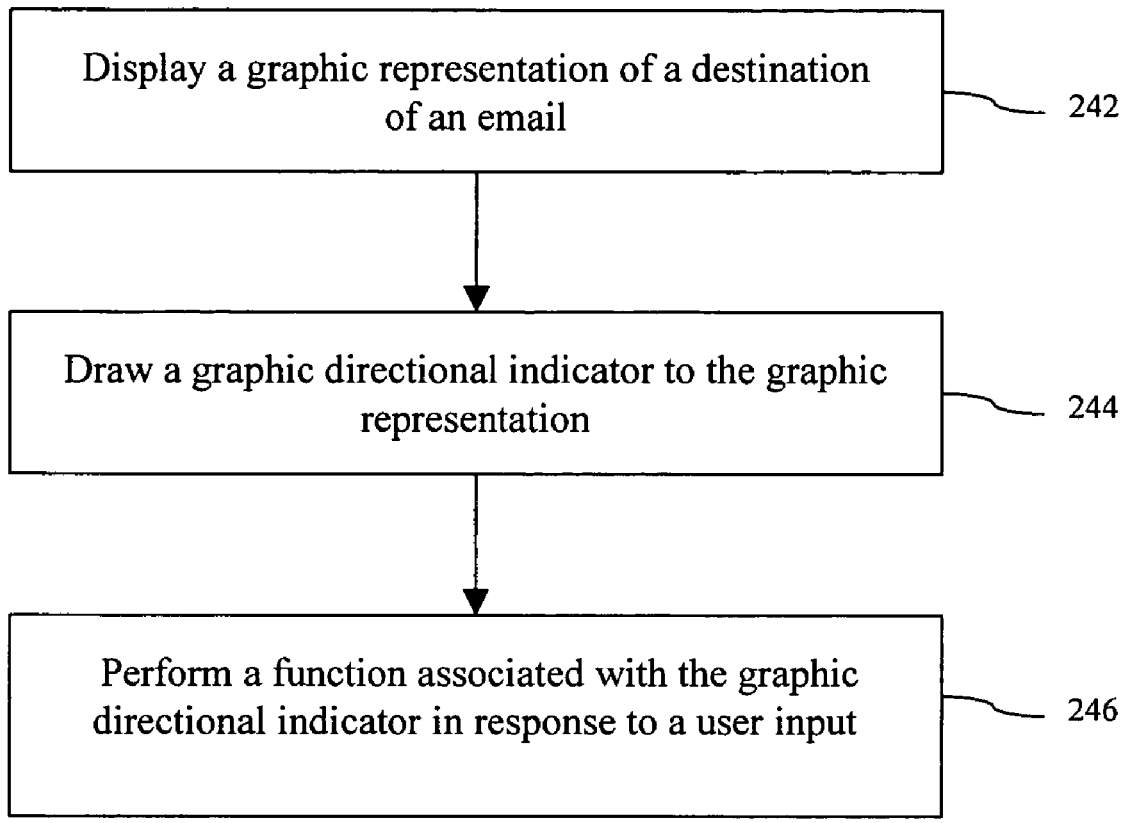
FIG. 15 is a flow diagram of a method for sending and receiving emails in accordance with an embodiment of the invention.

Turning now to FIG. 14, a flow chart of a process for constructing an email entry in accordance with an embodiment is shown. At block 218, a determination is made whether the email is an incoming email. If yes, then a determination is made whether the email is unread, at block 220. If yes, then the email entry is highlighted, at block 222, and the process proceeds to block 224. If no, then the process proceeds directly to block 224. At block 224, the sender is added to the address field.

Referring back to block 218, if the email is not an incoming email, then a determination is made whether the email is unsent, at block 226. If yes, then the email entry is highlighted, at block 228 and the process proceeds to block 230. If no, then the process proceeds directly to block 230. At block 230, the address is added to the destination field. Next, at block 232, the destinations are added to the address field.

Next, at block 234, the date is added to the date field. Next, at block 236, a determination is made whether the "show inline" flag is set. If yes, then the email is opened in the title field, at block 238, and the process proceeds to block 240. If no, then the process proceeds directly to block 240. At block 240, the title is added to the title field and the process comes to an end.

In an embodiment, the above-described processes may be embodied in a computer readable storage medium, such as a CD, that includes instructions, which can be executed by the computer system 110, to perform various email sending and receiving operations.

A method for sending and receiving emails in accordance with an embodiment of the invention is described with reference to a flow diagram of FIG. 14. At block 242, a graphic representation of a destination of an email is displayed on a display device. Next, at block, a graphic directional indicator, e.g., an arrow, is drawn to the graphic representation on the display device. Next, at block, a function associated with the graphic directional indicator is performed in response to a user input to send at least one graphic element displayed on the display device to the destination as part of the email.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for sending and receiving electronic messages, said method comprising:
displaying a graphic representation of a destination on a display device to deliver an electronic message;
drawing a graphic directional indicator to said graphic representation on said display device;
drawing a second graphic directional indicator that graphically contacts said graphic directional indicator;

associating a user-entered graphic object or a user-entered command; and performing a function associated with said graphic directional indicator in response to a user input to send at least one graphic element displayed on said display device to said destination as part of said electronic message.

2. The method of claim 1 wherein said drawing of said graphic directional indicator includes drawing an arrow to said graphic representation on said splay device.

3. The method of claim 1 wherein said displaying of said graphic representation includes displaying a network address.

4. The method of claim 1 wherein said displaying of said graphic representation includes displaying a graphic object that comprises at least one network address.

5. The method of claim 1 wherein said drawing of said graphic directional indicator includes drawing said graphic directional indicator that intersects at least one graphic object displayed on said display device.

6. The method of claim 1 wherein said drawing of said graphic directional indicator includes drawing said graphic directional indicator that substantially encircles at least one graphic object displayed on said display device.

7. The method of claim 1 wherein said performing of said function includes saving said graphic element to send as part of said electronic message.

8. The method of claim 7 wherein said graphic element is a graphic object in a computer operating environment.

9. The method of claim 1 wherein said performing of said function includes saving a system state of a computer operating environment in which said graphic directional indicator was drawn to send as part of said electronic message.

10. The method of claim 1 further comprising:
designating said user-entered graphic object as a title for said electronic message.

11. The method of claim 1 further comprising:
modifying a sending operation of said electronic message according to said user-entered command.

12. The method of claim 1 further comprising graphically moving a password object to said graphic element to secure said graphic element.

13. The method of claim 1 further comprising displaying an entry representing said electronic message and graphically moving a password object to said entry to secure said electronic message.

14. The method of claim 1 further comprising sorting received electronic messages based on a password object used to secure some of said received electronic messages.

15. The method of claim 1 further comprising displaying an entry representing said electronic message and displaying a duplicate of said graphic element in said entry, said duplicate having same properties of said graphic element such that said duplicate can be used in the same manner as said graphic element.

16. A storage medium readable by a computer, tangibly embodying a program of instructions executable by said computer to perform method steps for sending and receiving electronic message, said method steps comprising:
displaying a graphic representation of a destination on a display device on deliver an electronic message;
drawing a graphic directional indicator to said graphic representation on said display device;
drawing a second graphic directional indicator that graphically contacts said graphic directional indicator;

associating a user-entered graphic object or a user-entered command; and performing a function associated with said graphic directional indicator in response to a user input to send at least one graphic element displayed on said display device to said destination as part of said electronic message.

17. The storage medium of claim 16 wherein said drawing of said graphic directional indicator includes drawing an arrow to said graphic representation on said display device.

18. The storage medium of claim 16 wherein said displaying of said graphic representation includes displaying a network address.

19. The storage medium of claim 16 wherein said displaying of said graphic representation includes displaying a graphic object that comprises at least one network address.

20. The storage medium of claim 16 wherein said drawing of said graphic directional indicator includes drawing said graphic directional indicator that intersects at least one graphic object displayed on said display device.

21. The storage medium of claim 16 wherein said drawing of said graphic directional indicator includes drawing said graphic directional indicator that substantially encircles at least one graphic object displayed on said display device.

22. The storage medium of claim 16 wherein said performing of said function includes saving said graphic element to send as part of said electronic message.

23. The storage medium of claim 22 wherein said graphic element is a graphic object in a computer operating environment.

24. The storage medium of claim 16 wherein said performing of said function includes saving a system state of a computer operating environment in which said graphic directional indicator was drawn to send as part of said electronic message.

25. The storage medium of claim 16 further comprising:
designating said user-entered graphic object as a title for said electronic message.

26. The storage medium of claim 16 further comprising:
modifying a sending operation of said electronic message according to said user-entered command.

27. The storage medium of claim 16 further comprising graphically moving a password object to said graphic element to secure said graphic element.

28. The storage medium of claim 16 further comprising displaying an entry representing said electronic message and graphically moving a password object to said entry to secure said electronic message.

29. The storage medium of claim 16 further comprising sorting received electronic messages based on a password object used to secure some of said received electronic messages.

30. The storage medium of claim 16 further comprising displaying an entry representing said electronic message and displaying a duplicate of said graphic element in said entry, said duplicate having same properties of said graphic element such that said duplicate can be used in the same manner as said graphic element.

31. A system for sending and receiving electronic messages, said system comprising:
a display device that can display a graphic representation of a destination of an electronic message, a graphic directional indicator and a graphic element;
a module configured to send said graphic element as part of said electronic message when said graphic directional indicator is drawn on said display device to said graphic representation, a second graphic directional indicator that graphically contacts said graphic directional indicator is drawn on said display device and a function associated with said graphic directional indicator is activated, said module being further configured to associate a user-entered graphic object or a user-entered command with said second graphic directional indicator; and a network interface connected to a computer network, said network interface being configured to transmit said electronic message to said destination through said computer network.

32. The system of claim 31 wherein said graphic directional indicator includes an arrow to said graphic representation.

33. The system of claim 31 wherein said graphic representation includes a network address.

34. The system of claim 31 wherein said graphic representation comprises a graphic object that includes at least one network address.

35. The system of claim 31 wherein said graphic directional indicator is drawn to intersect at least one graphic object displayed on said display device.

36. The system of claim 31 wherein said graphic directional indicator is drawn to substantially encircle at least one graphic object displayed on said display device.

37. The system of claim 31 wherein said module is configured to save said graphic element to send as part of said electronic message.

38. The system of claim 37 wherein said graphic element is a graphic object in a computer operating environment.

39. The system of claim 31 wherein said module is configured to save a system state of a computer operating environment in which said graphic directional indicator was drawn to send as part of said electronic message.

40. The system of claim 31 wherein said module is further configured to include said user-entered graphic object associated with a said second graphic directional indicator that graphically contacts said graphic directional indicator as a title for said electronic message.

41. The system of claim 31 wherein said module is further configured to modify a sending operation of said electronic message according to said user-entered command associated with said second graphic directional indicator that graphically contacts said graphic directional indicator.

42. The system of claim 31 wherein said module is configured to secure said graphic element when a password object is moved to said graphic element.

43. The system of claim 31 wherein said module is configured to secure said electronic message when a password object is moved to an entry representing said electronic message.

44. The system of claim 31 wherein said module is configured to sort received electronic messages based on a password object used to secure some of said received electronic messages.

45. The system of claim 31 wherein said module is configured to display a duplicate of said graphic element in an entry representing said electronic message, said duplicate having same properties of said graphic element such that said duplicate can be used in the same manner as said graphic element.

46. A method for sending and receiving electronic messages, said method comprising:

displaying a graphic representation of a destination on a display device to deliver an electronic message;

drawing a graphic directional indicator to said graphic representation on said display device; and performing a function associated with said graphic directional indicator in response to a user input to send at least one graphic element displayed on said display device to said destination as part of said electronic message, wherein said drawing of said graphic directional indicator includes drawing said graphic directional indicator that substantially encircles at least one graphic object displayed on said display device.

47. A method for sending and receiving electronic messages, said method comprising:

displaying a graphic representation of a destination on a display device to deliver an electronic message;

drawing a graphic directional indicator to said graphic representation on said display device;

graphically moving a password object to said graphic element or an entry representing said electronic message to secure said graphic element or said electronic message; and performing a function associated with said graphic directional indicator in response to a user input to send at least one graphic element displayed on said display device to said destination as part of said electronic message.

48. A method for sending and receiving electronic messages, said method comprising:

displaying a graphic representation of a destination on a display device to deliver an electronic message;

drawing a graphic directional indicator to said graphic representation on said display device;

performing a function associated with said graphic directional indicator in response to a user input to send at least one graphic element displayed on said display device to said destination as part of said electronic message; and sorting received electronic messages based on a password object used to secure some of said received electronic messages.

49. A method for sending and receiving electronic messages, said method comprising:

displaying a graphic representation of a destination on a display device to deliver an electronic message;

drawing a graphic directional indicator to said graphic representation on said display device;

performing a function associated with said graphic directional indicator in response to a user input to send at least one graphic element displayed on said display device to said destination as part of said electronic message; and displaying an entry representing said electronic message and displaying a duplicate of said graphic element in said entry, said duplicate having same properties of said graphic element such that said duplicate can be used in the same manner as said graphic element.

50. A storage medium readable by a computer, tangibly embodying a program of instructions executable by said computer to perform method steps for sending and receiving electronic message, said method steps comprising:

displaying a graphic representation of a destination on a display device to deliver an electronic message;

drawing a graphic directional indicator to said graphic representation on said display device; and graphically moving a password object to said graphic element or an entry representing said electronic message to secure said graphic element or said electronic message, wherein said drawing of said graphic directional indicator includes drawing said graphic directional indicator that substantially encircles at least one graphic object displayed on said display device.

51. A storage medium readable by a computer, tangibly embodying a program of instructions executable by said computer to perform method steps for sending and receiving electronic message, said method steps comprising:
   displaying a graphic representation of a destination on a display device to deliver an electronic message;
   drawing a graphic directional indicator to said graphic representation on said display device;
   graphically moving a password object to said graphic element or an entry representing said electronic message to secure said graphic element or said electronic message; and
   performing a function associated wit said graphic directional indicator in response to a user input to send at least one graphic element displayed on said display device to said destination as part of said electronic message.

52. A storage medium readable by a computer, tangibly embodying a program of instructions executable by said computer to perform method steps for sending and receiving electronic message, said method steps comprising:
   displaying a graphic representation of a destination on a display device s to deliver an electronic message;
   drawing a graphic directional indicator to said graphic representation on said display device;
   performing a function associated with said graphic directional indicator in response to a user input to send at least one graphic element displayed on o said display device to said destination as part of said electronic message; and
   sorting received electronic messages based on a password object used to secure some of said received electronic messages.

53. A storage medium readable by a computer, tangibly embodying a program of instructions executable by said computer to perform method steps for sending and receiving electronic message, said method steps comprising:
   displaying a graphic representation of a destination on a display device to deliver an electronic message;
   drawing a graphic directional indicator to said graphic representation on said display device;
   a performing a function associated with said graphic directional indicator in response to a user input to send at least one graphic element displayed on said display device to said destination as part of said electronic message; and
   displaying en entry representing said electronic message and displaying a duplicate of said graphic element in said entry, said duplicate having same properties of said graphic element such that said duplicate can be used in the same manner as said graphic element.

54. A system for sending and receiving electronic messages, said system comprising:
   a display device that can display a graphic representation of a destination of an electronic message, a graphic directional indicator and a graphic element;
   a module configured to send said graphic element as part of said electronic massage when said graphic directional indicator is drawn on said display device to said graphic representation and a function associated with said graphic directional indicator is activated; and
   a network interface connected to a computer network, said network interface being configured to transmit said electronic message to said destination through said computer network,
   wherein said graphic directional indicator is drawn to substantially encircle at least one graphic object displayed on said display device.

55. A system for sending and receiving electronic messages, said system comprising;
   a display device that can display a graphic representation of a destination of an electronic message, a graphic directional indicator and a graphic element;
   a module configured to send said graphic element as part of said electronic message when said graphic directional indicator is drawn on said display s device to said graphic representation and a function associated with said graphic directional indicator is activated; and
   a network interface connected to a computer network, said network interface being configured to transmit said electronic message to said destination through said computer network,
   wherein said module is configured to secure said graphic element or said electronic message when a password object is moved to said graphic element or an entry representing said electronic message.

56. A system for sending and receiving electronic messages, said system comprising:
   a display device that can display a graphic representation of a destination of an electronic message, a graphic directional indicator and a graphic element;
   a module configured to send said graphic element as part of said electronic message when said graphic directional indicator is drawn on said display device to said graphic representation and a function associated with said graphic directional indicator is activated; and
   a network interface connected to a computer network, said network interface being configured to transmit said electronic message to said destination through said computer network,
   wherein said module is configured to sort received electronic messages based on a password object used to secure some of said received electronic messages.

57. A system for sending and receiving electronic messages, said system comprising:
   a display device that can display a graphic representation of a destination of an electronic message, a graphic directional indicator and a graphic element;
   a module configured to send said graphic element as part of said electronic message when said graphic directional indicator is drawn on said display device to said graphic representation and a function associated with said graphic directional indicator is activated; and
   a network interface connected to a computer network, said network interface being configured to transmit said electronic message to said destination through said computer network,
   wherein said module is configured to display a duplicate of said graphic element in an entry representing said electronic message, said duplicate having same properties of said graphic element such that said duplicate can be used in the same manner as said graphic element.

* * * * *